United States Patent [19]

Yamada et al.

[11] Patent Number: 4,987,356
[45] Date of Patent: Jan. 22, 1991

[54] PROFILING CONTROL SYSTEM FOR GIVEN CURVED SURFACE

[75] Inventors: Kazuyoshi Yamada, Ibaraki; Kunio Kashiwagi, Tsuchiura; Tooru Kurenuma, Ibaraki, all of Japan

[73] Assignee: Hitachi Construction Machinery Co., Ltd., Tokyo, Japan

[21] Appl. No.: 421,371

[22] Filed: Oct. 13, 1989

[30] Foreign Application Priority Data

Oct. 14, 1988 [JP] Japan .................. 63-258598
Oct. 24, 1988 [JP] Japan .................. 63-267952

[51] Int. Cl.$^5$ .......................................... G05B 19/18
[52] U.S. Cl. ................................ 318/578; 318/571; 318/572; 364/474.03
[58] Field of Search .......................... 318/560–646; 364/513, 474.03, 474.37, 189–193

[56] References Cited

U.S. PATENT DOCUMENTS 4,666,352  5/1987  Nagao et al. ............ 364/474.03 X
4,702,652 10/1987  Rokksku et al. ......... 364/474.03 X
4,719,578  1/1988  Okitomo et al. ............. 318/578 X
4,746,251  5/1988  Yoshikawa et al. .......... 318/578 X

FOREIGN PATENT DOCUMENTS 613010  1/1985  Japan .
617905 11/1985  Japan .

OTHER PUBLICATIONS

"Transactions of the Society of Instrument and Control Engineers", vol. 22, No. 3 (1986), pp. 343–350.

Primary Examiner—Paul Ip
Attorney, Agent, or Firm—Fay, Sharpe, Beall, Fagan, Minnich & McKee

[57] ABSTRACT

A profiling control system for a multiple-degree-of-freedom working machine having at least two degrees of freedom has at least one force control loop. The control loop has a detector for detecting the force applied to a working tool from a work surface, an error detector for determining the difference between the detected force and a command $f_{ro}$ of urging force of the working took, a processor for computing a velocity command $u_z$ of the working tool on the basis of the determined error, a drive system for moving the multiple-degree-of-freedom working machine on the basis of the velocity command. Further, the multiple-degree-of-freedom working machine is moved on the basis of a velocity command $u_x$. The control system provides a moving velocity $v_{zof}$ in an urging direction of the working tool, which occurs as the result of a gradient tan α of the work surface with respect to a feed direction when the working tool is fed with the velocity command $u_x$ and while the working tool is urged against the work surface with the force command $f_{ro}$. Also, a controlled variable, either $f_{ro}$ or $u_z$ of the force control loop is corrected by using the moving velocity $V_{zof}$ in the urging direction, thereby canceling the force $f_{of}$ due to the velocity $v_{zof}$.

10 Claims, 16 Drawing Sheets

PROFILING CONTROL SYSTEM FOR GIVEN CURVED SURFACE

BACKGROUND OF THE INVENTION

The present invention relates to profiling control systems which use multiple-degree-of-freedom working machines such as robots, machine tools and the like which have at least two degrees of freedom and, more particularly, to a profiling control system for controlling, by means of position and force, a multiple degree-of-freedom working machine such as a robot, a machine tool or the like which performs a profiling operation such as deburring, curved-surface polishing, a measurement of configuration of a curved surface or the like, thereby profiling a given curved surface.

Almost all of the present industrial robots and automatic machines tool operate by means of control of positions on the basis of position information. It is necessary to control the extent of force applied in performing such as operation fitting operations or polishing operations. In order to control the extent of force, it is required to well control both the position and the force. To this end, various studies and research have been conducted. As typical examples, there are a hybrid control in which a position control and a force control are controlled in switched intervals of each coordinate axis, and a compliance control in which a position and a force are related by means of a spring.

Further, in recent years, there is a so-called virtual compliance control as disclosed in "Transactions of the Society of Instrument and Control Engineers (Keisoku Jido Seigyo Gakkai Ronbun-shu)", vol. 22, No. 3 (1986), pp. 343~350, JP-A-60-3010 and JP-A-61-7905. The virtual compliance control is one in which a dynamic system having spring.mass.damper is realized virtually. That is, the virtual compliance control is one in which values of m, c and k of the following equation in the dynamic system are given optionally, and their movement is simulated by software, to perform control so as to realize the movement:

$$m\ddot{x} + c\dot{x} + k\Delta x = f.$$

In order to effect the control in a multiple degree-of-freedom system, the values of m, c and k can be changed at intervals of each axis of the coordinate system. If the values of m, c and k are selected properly or adequately, it is possible to change a characteristic at intervals of each axis. Further, if $k = 0$, the feedback of the position is eliminated so that a force-control mode is realized. If the values of k and c increase so that the force feedback is eliminated, a positioncontrol mode is realized. Thus, it is possible to effect a so-called hybrid control. In this manner, the virtual compliance control can be said to be a control system which includes the hybrid control and the compliance control.

In case where the conventional virtual compliance control is applied to a profiling control system which utilizes the multiple degree-of-freedom working machine, however, profiling of a given curved surface has its limit, and there is such a problem that it is impossible to conduct an adequate and efficient operation.

For instance, as one of operations which is performed by the robot by control of position and force, there is a curved-surface profiling operation in which a work surface is profiled to effect surface polishing, deburring or the like. In this case, a working tool of the robot is controlled so as to move in profile of the work surface. The force and moment applied to the working tool are detected by a force sensor. A case will be considered where the curved-surface profiling operation is effected in application of the virtual compliance control. Here, a moving direction of the working tool is an x-axis direction, and an axial direction of the working tool is a z-axis direction. Description will be made in an $x-z$ plane, for convenience. For example, the values of k and c increase to be hardened, in the x-axis direction, and the working tool is fed at a velocity $v_x$ by the position control. In the z-axis direction, $k=0$, to release restriction of the position. The working tool is urged with a target force $f_r$ by the force control. At this time, if the force detected by the force sensor is f, the working tool moves in imitation of the following equation, in the z-axis direction:

$$m\dot{v}_z + cv_z = f - f_r.$$

Accordingly, under a steady state in which there is no change in velocity, $cv_z = f - f_r$. Thus, in order to generate the velocity $v_z$ at which the curved surface is profiled, it can be understood that there must correspondingly be a force error $\Delta f = f - f_r$. Here, if the feed velocity $v_x$ in the x-direction is constant, the velocity $v_z$ is in proportion to a gradient of the curved-surface. Accordingly, the force error $\Delta f$ is brought to a value which is in proportion to the gradient of the curved surface, so that the urging force $-f$ changes in accordance with the change in the gradient of the curved surface. Now, if the force error permitted or allowed in the profiling operation is $\Delta f_o$, the gradient is as follows which can be followed under the steady state:

$$\frac{1}{c} \cdot \frac{\Delta f_o}{v_x}$$

Here, if $1/c$ increases, the gradient also increases, which can be followed. Since, however, $1/c$ is brought to a gain ($v = 1/c \cdot f$) of the velocity with respect to the force, increase in $1/c$ will cause hunting. For this reason, $1/c$ must decrease, and it cannot because of an increase in the feed velocity $v_x$ with respect to the large gradient. Thus, increasing $1/c$ is not efficient and lacks practicality.

In this manner, the conventional profiling control system has a limit in profiling a given curved surface.

It is an object of the invention to provide a profiling control system utilizing a multiple degree-of-freedom working machine, in which it is possible to feed the multiple degree-of-freedom working machine at a requisite feed velocity regardless of a gradient of a curved surface, and it is possible to effect adequate and efficient operation.

SUMMARY OF THE INVENTION

For the above purpose, according to the invention, there is provided a profiling control system which uses a multiple degree-of-freedom working machine having at least two degrees of freedom, the profiling control system comprising: at least one force control loop including means for detecting force applied to a working tool from a work surface, means for taking an error between the detected force and a command $f_{ro}$ of urging force of the working tool, which is set beforehand, means for computing a velocity command $u_z$ of the working tool on the basis of the error, and means for moving the multi-degree-of-freedom working machine on the basis of the velocity command $u_z$; means for commanding at least one velocity command $u_x$ of the working tool; and means for moving the multi-degree-of-freedom working machine on the basis of the velocity command $u_x$, wherein the profiling control system comprises: first control means for providing a moving velocity $v_{zof}$ in an urging direction, of the working tool, which occurs due to a gradient $\tan \alpha$ of the work surface with respect to a feed direction when the working tool is fed with the velocity command $u_x$ while the working tool is urged against the work surface with the force command $f_{ro}$; and second control means for using the moving velocity $v_{zof}$ in the urging direction to correct a controlled variable $f_{ro}$ or $u_z$ of the force control loop, thereby canceling force $f_{of}$ due to the velocity $v_{zof}$.

Generally, in the profiling control system according to the invention, when the work surface is profiled by the working tool with a feed velocity $v_x$ based on a velocity command $v_x$ and the working tool is urged against the working surface with a force command $f_{ro}$, a velocity $v_{zof} = v_x \tan \alpha$ is generated in the urging direction by the gradient $\tan \alpha$ of the work surface with respect to the feed direction of the working tool. Further, apart from the force of the command $f_{ro}$, a force in the urging direction is generated that is $f_{of} = C v_x \tan \alpha$ (C is constant) due to the velocity $v_{zof}$.

In the invention, the moving velocity $v_{zof}$ is provided in the first control means. In the second control means, the controlled variable of the force control loop is corrected by the use of the moving velocity $v_{zof}$, to cancel the force $f_{of}$ due to the velocity $v_{zof}$. By this reason, the urging force of the working tool is substantially coincident with the command $f_{ro}$, so that profiling at the desired velocity in accordance with the velocity command $v_x$ is made possible.

In connection with the above, "means for commanding at least one velocity command $u_x$ of the working tool" can take variable forms. For instance, the commanding means may be means in the position control loop in which a position of the working tool moving on the work surface is detected, an error is taken between the detected position and a preset command of the position of the working tool, and the velocity command $u_x$ of the working tool is computed on the basis of the error. The aforesaid means may be means in the velocity control loop in which a velocity of the working tool moving on the work surface is detected, an error is taken between the detected velocity and a preset command of the velocity of the working tool, and the velocity command $u_x$ of the working tool is computed on the basis of the error. In these cases, "a command of a position of the working tool" and "a command of a velocity of the working tool" obtained from the position information stored as the taught data may be used in substitution respectively for "the preset command of the position of the working tool" and "the preset command of the velocity of the working tool". Further, the aforementioned means may be means which can command the velocity command $u_x$ directly by operation of an operator such as a joy-stick, a keyboard and the like.

The first control means may include first computing means for computing the gradient $\tan \alpha$ of the work surface, second computing means for computing the feed velocity $v_x$ of the working tool fed with said velocity command $u_x$; and third computing means for computing the moving velocity $v_{zof}$ in the urging direction from the gradient $\tan \alpha$ obtained by the first computing means and the feed velocity $v_x$ obtained by said second computing means.

Here, preferably, the first computing means is constructed by means for detecting a position of the working tool which moves on the work surface, and means for computing the gradient $\tan \alpha$ of the work surface from two positions including a present point of the working tool on the work surface, which is detected by the detecting means. This construction is adequate for computation during the profiling operation, since the two positions on the work surface are used as the detecting value.

Further, the first computing means may include means for computing the gradient $\tan \alpha$ of the work surface from a direction of the feed velocity vector v command $v_x$ and a direction of the force detected by the force detecting means. This construction is also adequate for computation during the profiling operation.

Furthermore, the first computing means may include fourth means for computing the gradient $\tan \alpha$ of the work surface, means for setting a feed target velocity $v_{xyo}$ of the working tool, and fifth computing means for computing the moving velocity $v_{zof}$ in the urging direction from the gradient $\tan \alpha$ obtained by the first computing means and said feed target velocity $v_{xyo}$.

In this case, the fourth computing means preferably includes means for detecting a position of the working tool which moves on the work surface, means for beforehand setting presetting a feed-target position of the working tool, means for computing a feed-direction vector m in a direction perpendicular to the urging direction of the working tool from two positions which include a present position of the working tool on the work surface, detected by the detecting means, and a feed-target position set beforehand in the setting means, and means for computing the gradient $\tan \alpha$ of the work surface from the feed-direction vector m and a direction of the force detected by the force detecting means. Since the feed-target position set beforehand as one of the two positions is used, the above arrangement is adequate for computation at start of the profiling operation in which the working tool does not yet move.

In connection with the above, in case where the direction of the force detected by the force detecting means is used in computation of the gradient $\tan \alpha$, forces in three axis directions are required as the force. Accordingly, a force detecting means is used which can detect forces at least in three axis directions perpendicular to each other, as applied to the working tool.

The foregoing is such that the first control means computes the gradient $\tan \alpha$ of the work surface, and the gradient $\tan \alpha$ is used to compute the moving velocity $v_{wof}$. However, the moving velocity $v_{wof}$ may be computed without the use of the gradient $\tan \alpha$. For example, the first control means may include means for detecting a position of the working tool which moves on the work surface, and sixth computing means for computing the moving velocity $v_{zof}$ in the urging direction from two positions which include a present point of the working tool on the work surface, which is detected by the detecting means, and from a moving time of the two positions. In this case, since it is unnecessary to compute the gradient, the computation can be made easily, and a high-speed computation treatment is made possible.

Moreover, when the configuration of the work surface is known and the moving velocity $v_{zof}$ in the urging direction can beforehand be predicted, the first control means may take such a construction that the predicted value is stored and is used.

Furthermore, the first control means may include means for beforehand storing the gradient tan α of the work surface, means for setting a feed target velocity $v_{xyo}$ of the working tool, and seventh computing means for computing the moving velocity $v_{zof}$ in the urging direction from the gradient tan α stored beforehand and the feed target velocity $v_{xyo}$. In this case, since the gradient tan α stored beforehand is used, a computing amount can be reduced less than the aforesaid case where the gradient tan α of the work surface is computed at the real time. Thus, a high-velocity computing treatment can be made possible.

On the other hand, the second control means may include eighth computing means for computing the force $f_{of}$ occurring due to the moving velocity $v_{zof}$ in the urging direction, and ninth computing means for subtracting the force $f_{of}$ from the command $f_{ro}$ of the urging force of the force control loop, to compute a new command $f_r$ of the urging force.

Further, the second control means include tenth computing means for using the moving velocity $v_{zof}$ in the urging direction as a velocity correcting value $v_{zc}$ and adding the velocity correcting value $v_{zc}$ to the velocity command $u_{zo}$ of the force control loop, to compute a new velocity command $u_z$.

As described above, in case where the working tool is profiled, at the velocity $v_x$, on the work surface of the gradient that is tan α, a velocity $v_{zof} = v_x \tan α$ occurs in the urging direction, and a force that is $f_{of} = Cv_x \tan α$ (C is constant) occurs due to the velocity $v_{zof}$. Accordingly, in order to cancel the force $f_{of}$ due to the velocity $v_{zof}$, the urging-force command that is the controlled variable may be corrected, or the velocity command $u_z$ may be corrected. Thus, it is possible for the second control means to subtract the force $f_{of}$ from the urging-force command $f_{ro}$ to compute a new urging-force command $f_r$, thereby profiling the work surface while the latter is urged with the force command $f_{ro}$. Furthermore, the similar results may be obtained in which the moving velocity $v_{zof}$ in the urging direction is brought to the velocity correcting value $v_{zc}$ to add the velocity correcting value $v_{zc}$ to the velocity command $u_{zo}$, thereby computing a new velocity command $u_z$.

DETAILED DESCRIPTION OF THE PREFERRED EMBODIMENTS

First Embodiment

A first embodiment of the invention will be described below with reference to FIGS. 1 through 4.

Figure 1:
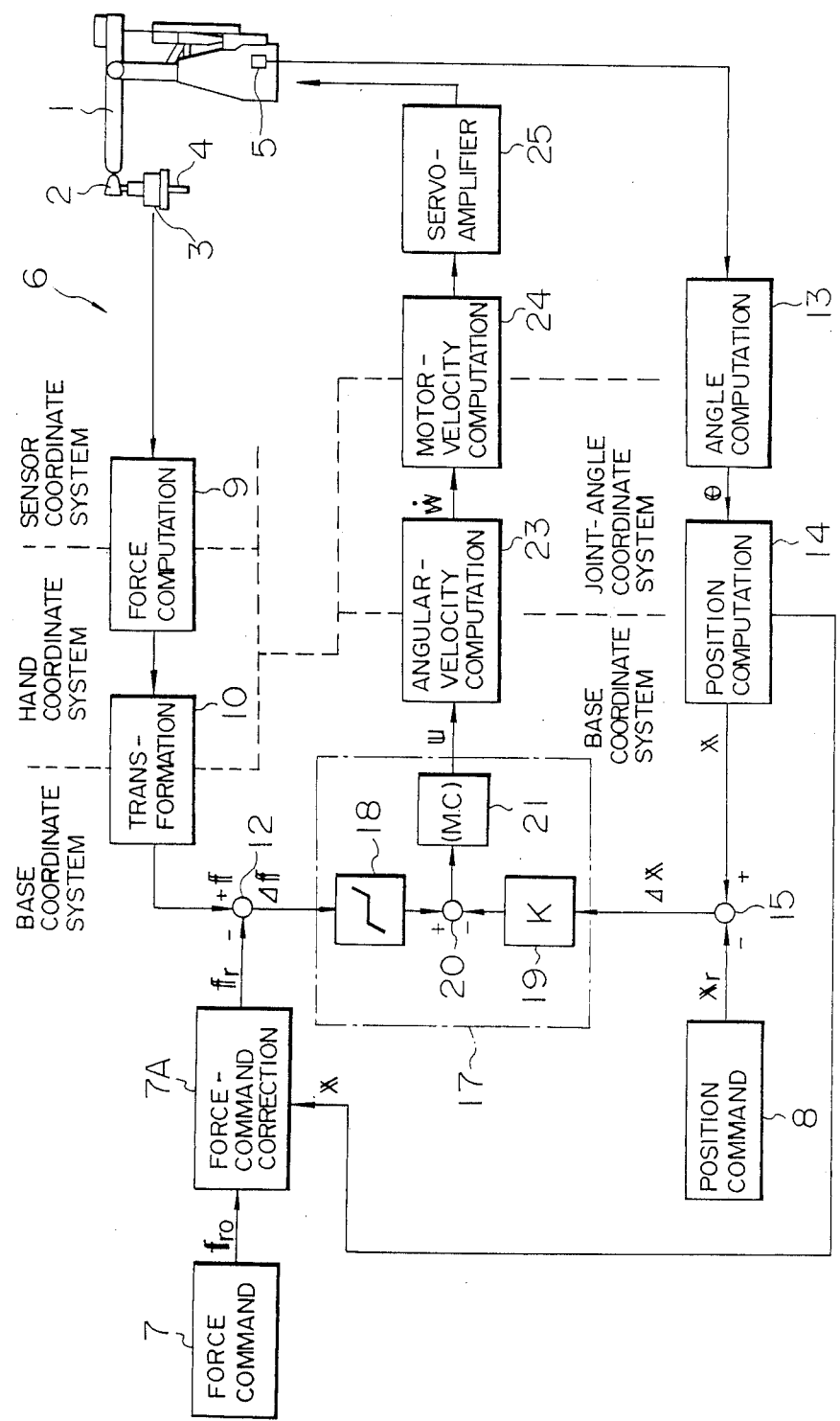
FIG. 1 is a functional block diagram showing an entire construction of a profiling control system according to a first embodiment of the invention.

In FIG. 1, a robot 1 of articulated type having six degrees of freedom, which is an example of a multiple degree-of-freedom working machine, comprises a hand 2 to which a working tool 4 is mounted. The working tool 4 has its position and posture (hereinafter referred to as "position/posture") controlled by the driving of drive motors (not shown) which drive the robot 1 around its joints. A profiling control system 6 of the embodiment with respect to such robot 1 has a force sensor 3 mounted between the hand 2 and the working tool 4 for detecting a force and a moment (hereinafter referred to as "force/moment") applied to the working tool 4, and an angle sensor, for example, an encoder 5 mounted to the drive motors (not shown) driving the robot 1 around its joints, for detecting an amount of driving of the drive motors, hence, axis angle data of respective joint shafts. Further, the profile control system 6 has a force-command setting section 7 for setting a command $f_{ro}$ of the urging-force/moment (hereinafter referred to as "urging-force command") of the working tool 4 as a value of a base coordinate system, and a position-command setting section 8 for setting a command $x_r$ for the position/posrure of the working tool 4 as a value of the base coordinate system. In this connection, the base coordinate system is a fixed coordinate system in a space within which the robot is installed.

Moreover, the profiling control system 6 comprises constructional elements or components for a force control loop, which include a force computing section 9 for transforming the force/moment detected by the force sensor 3, from a sensor coordinate system to a hand coordinate system, to effect gravity compensation subtracting a gravitational portion of the working tool 4, a transformation section 10 for transforming the force/moment expressed by the hand coordinate system, to the base coordinate system taking as its origin the origin of the hand coordinate system, and a force-error computing section 12 for comparing the force/moment f transformed by the transformation section 10 with a force/moment command $f_r$ obtained by a force-command correcting section 7A subsequently to be described, to compute $\Delta f = f - f_r$ thereby obtaining an error $\Delta f$. Further, the profiling control system 6 comprises constructional elements or components of the position control loop, which include an angle computing section 13 for having inputted thereto the axis angle data from the encoder 5 mounted to the motors of the robot 1, for computing an angle $\theta$ of each joint, a position computing section 14 for obtaining a hand position/posture x at the base coordinate system from the joint angle $\theta$, and a position-error computing section 15 for comparing the position/posture x computed by the position computing section 14, with a position/posture command $x_r$ set by the position-command setting section 8, to obtain an error $\Delta x$.

The error $\Delta f$ of the force/moment at the base coordinate system, computed by the force-error calculating section 12, and the error $\Delta x$ of the position/posture at the base coordinate system, computed by the position-error computing section 15, are inputted to a control computing section 17 for the position/force. The control computing section 17 control-computes the position/force at the base coordinate system on the basis of this information, to compute a velocity command u at the base coordinate system. In the embodiment, the control computing section 17 for the position/force utilizes control computation by a virtual compliance control.

That is, the control computing section 17 consists of a dead-zone computing section 18, a spring-constant multiplying section 19, a subtracting section 20, and a characteristic-compensation computing section 21. The dead-zone computing section 18 gives a dead zone to the force error $\Delta f$ computed by the force-error computing section 12, to compute $\Delta f'$. Thus, the dead-zone computing section 18 can set $\Delta f'$ so as not to react with fine force such as noise, disturbance and the like. A width or range of the dead zone can freely be set for each coordinate axis. It is possible to eliminate the dead zone. Alternatively, the width of the dead zone can increase to make its output always zero so that a force feed-back is eliminated to conduct only the position control. The spring-constant multiplying section 19 multiplies a virtual springconstant matrix K set for each coordinate axis, to the position error $\Delta x$, to compute $K\Delta x$. K is a diagonal matrix and has a component $k_i$ which is a virtual spring constant for each coordinate axis and which can be set optionally. Particularly, if $k_i = 0$, the position feedback can also be eliminated to effect only the force control.

The subtracting section 20 subtracts the value $K\Delta x$ multiplying the virtual spring-constant matrix K to the position error $\Delta x$, from the value $\Delta f'$ which conducts the dead-zone computation to the force error $\Delta f$.

The characteristic-compensation computing section 21 conducts characteristic-compensation computation on the control to the output $\Delta f' - K\Delta x$ of the subtracting section, to output a velocity command u. In the virtual compliance control, the velocity command is computed so as to move in imitation of the following equation, by a virtual mass matrix M and a virtual viscosity-coefficient matrix C:

$$M\dot{u} + Cu = \Delta f - K\Delta x \qquad (1)$$

Lastly, the profiling control system 6 has output sections that include an angular-velocity computing section 23 for computing an angular-velocity command $\dot{w}$ of each joint from the velocity command u computed by the control computing section 17 for the position/force, and a motor-velocity computing section 24 for computing a velocity command for each drive motor, from the angular-velocity command $\dot{w}$. The velocity command computed by the motor-velocity computing section 24 is sent to a servoamplifier 25, to drive the motors of the robot 1 by the velocity command of each drive motor. The velocity command also includes a velocity feed-back from a tachgenerator which is mounted to the motor.

The force control loop is constituted by the force sensor 3, the force computing section 9, the transformation section 10, the force-command setting section 7, the force-command correcting section 7A, the force-error computing section 12, the control computing section 17, the angular-velocity computing section 23, the motor-velocity computing section 24, and the servoamplifying section 25. The position control loop is constituted by the encoder 5, the angle computing section 13, the position computing section 14, the position-command setting section 8, the position-error computing section 15, the control computing section 17, the angular-velocity computing section 23, the motor-velocity computing section 24, the servoamplifying section 25.

A function of the force-command correcting section 7A will be described with reference to FIG. 2.

Figure 2:
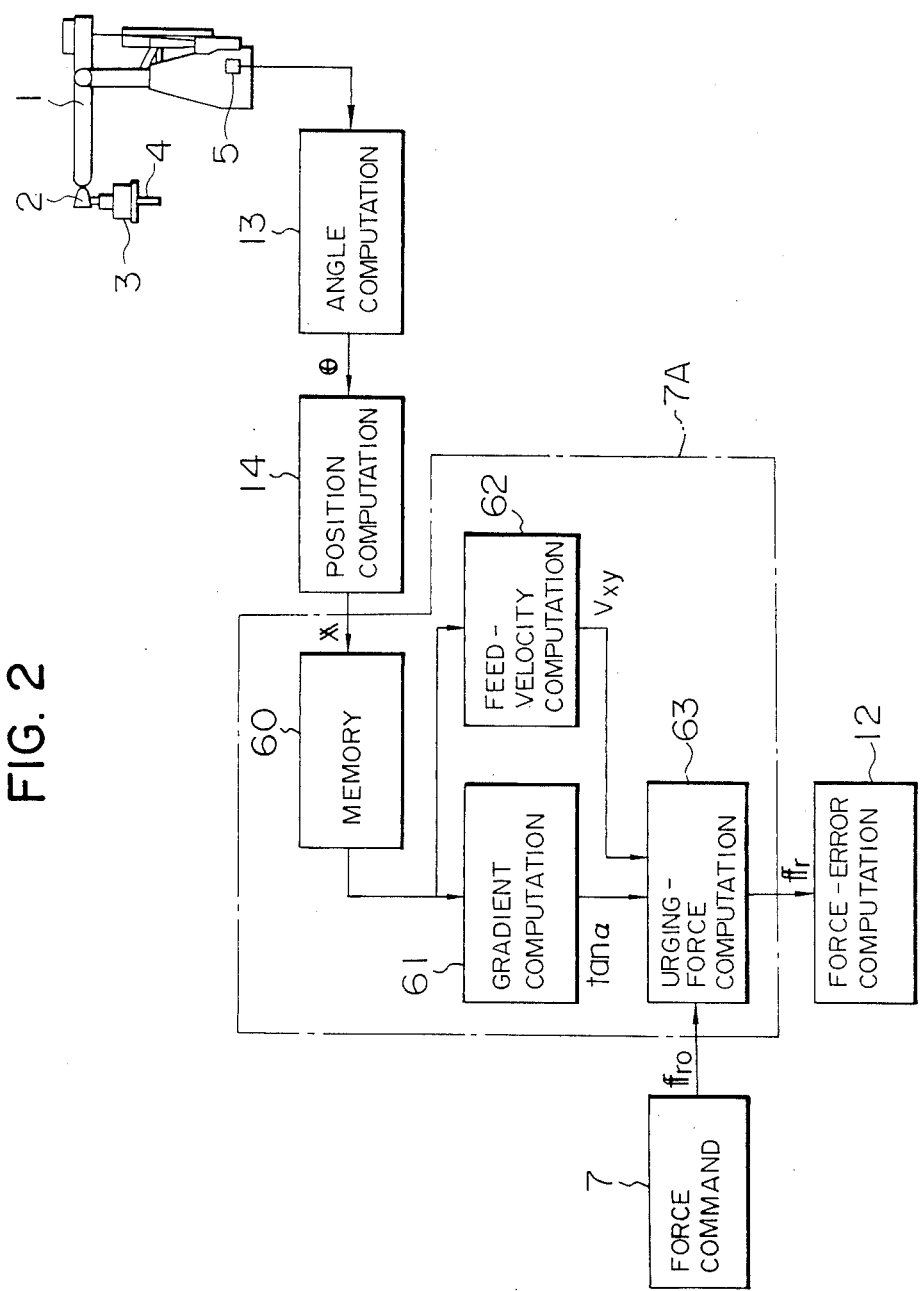
FIG. 2 is a functional block diagram showing a construction of a force-command correcting section of the profiling control system.

In FIG. 2, the joint angle $\theta$ calculated by the angle computing section 13 is sent to the position computing section 14, so that the hand position/posture x at the base coordinate system is obtained from the joint angle $\theta$. The urging-force command $f_{r0}$ is set in the force-command setting section 7 as a value of the base coordinate system.

The force-command correcting section 7A consists of a memory section 60 for successively storing therein the position data of the hand position/posture x obtained by the position computing section 14 in accordance with movement of the hand, a gradient computing section 61 for computing a gradient of the work surface in a moving direction of the working tool 4 with respect to a plane perpendicular to the urging direction of the working tool 4, on the basis of the position data stored in the memory section 60, a feed-velocity computing section 62 for computing a moving velocity, that is, a feed velocity of the working tool 4 projected onto a plane perpendicular to the urging direction from the position and its detecting time obtained by the position computing section 14, and an urging-force computing section 63 for computing a new urging-force command $f_r$ as an urging-force command from the gradient obtained by the gradient computing section 61, the feed velocity obtained by the feed-velocity computing section 62 and the urging-force command $f_{ro}$ set by the force-command setting section 7.

The new urging-force command $f_r$ obtained by the urging-force computing section 63 is outputted to the force-command computing section 12. In this connection, the position data stored in the memory section 60 are stored at the intervals of each optional time or each moving distance. Numbers of the position data are within a range which is used in the gradient computing section 61.

The operation of the profiling control system 6 constructed as above will be described. First, the operation of the entire control system illustrated in FIG. 1 will be described.

In a curved-surface profiling operation that performs surface polishing, deflashing and the like, a force/moment is applied to the working tool 4 mounted to the robot 1 as a reacting force of the urging force. In the force control loop, the force/moment is detected by the force sensor 4. The detected force/moment is brought to a value of the sensor coordinate system which is fixed to the sensor and which has an origin as a deformation center of the sensor. Accordingly, the value is brought to an origin of an adequate location for the working tool at the force computing section 9, and is transformed into the hand coordinate system which is fixed to the working tool and which moves together with the hand. Usually, the origin is taken in the vicinity of an impacting force point having applied thereto the force, so that the transformation matrix from the sensor coordinate system is brought to a constant matrix. Further, in the force computing section 9, the gravity compensation is effected in which the gravitational portion of the working tool 4 is subtracted, so that an influence of the gravity of the working tool 4, which varies dependent upon the posture of the hand, is eliminated.

The force/moment transformed by the hand coordinate system in this manner is transformed, by the transformation section 10, to the base coordinate system which has its origin the same as the hand coordinate system. That is, the base coordinate system is defined such that the direction of the three axes perpendicular to each other are coincident with the base coordinate system, and only the directions are transformed (rotation-transformed) to the base coordinate system in the transformation section 10. The transformation is given by the direction of the hand coordinate system with respect to the base coordinate system. Since the transformation is similar to the matrix expressing the hand posture subsequently to be described, the transformation is always computed, so that the transformation can easily be conducted.

The force f at the base coordinate system obtained in this manner is compared with the urging-force command $f_r$ obtained at the urging-force computing section 63, and the force error $\Delta f$ is computed by the force-error computing section 12.

On the other hand, with reference to the position control loop, the joint angle $\theta$ is computed by the angle computing section 13, from the values of the encoders which are mounted to the motors of the robot 1. Further, the hand position/posture x in the base coordinate system is computed by the position computing section 14, from the joint angle $\theta$. The hand position/posture is viewed from the position of the origin and the coordinate axis of the hand coordinate system. In FIG. 1, the position/posture in the base coordinate system is expressed by the six-dimensional vector x. In this case, the three-dimensional vector expressing the posture in the six-dimensional vector x is brought to a vector (a vector in which the direction is brought to the rotational-axis direction, and the magnitude is brought to the rotational angle) which expresses the rotational angle of the hand coordinate system with respect to the base coordinate system.

In the actual computation, the posture is not expressed as above, but is expressed by $3 \times 3$ matrices ($i_h$, $j_h$, $k_h$) which consist of $i_h$, $j_h$, $k_h$ in which a unit vector in each coordinate-axis direction of the hand coordinate system is expressed by the base coordinate system.

The position/posture x computed by the position computing section 14 in this manner is compared with a position/posture command $x_r$ set by the setting section 8, so that an error $\Delta x$ of the position/posture is computed by the computing section 15. Among this, an error of the posture can be expressed by a vector which expresses the rotational angle between the target posture and the actual posture. If a matrix expressing the posture of the target hand coordinate system is ($i_{hr}$, $j_{hr}$, $k_{hr}$), the error of the posture can be expressed by $\Psi e$. Here, e is a unit vector of the rotational axis, and $\Psi$ is the rotational angle around the axis. e and $\Psi$ can be expressed as follows:

$$e = \frac{(i_h - i_{hr}) \times (j_h - j_{hr})}{|(i_h - i_{hr}) \times (j_h - j_{hr})|}$$

$$\Psi = 2\tan^{-1} \frac{e \cdot (i_h \times i_{hr})}{i_h \cdot i_{hr} - 2(e \cdot i_h) + 1}$$

The force error $\Delta f$ and the position error $\Delta x$ at the base coordinate system, obtained in this manner, are used to conduct the control computation at the control computing section 17 of the position/posture. In the embodiment, as a concrete example of the computation, the virtual compliance control computation is effected due to the elements 18~21 as mentioned previously.

That is, the dead-zone computation is effected for each coordinate axis of the force error $\Delta f$ at the dead-zone computing section 18, to compute $\Delta f'$. The virtual spring-constant matrix K set at intervals of each coordinate axis is multiplied to the position error $\Delta x$ at the spring-constant multiplying section 19, to compute $K\Delta x$. $K\Delta x$ is subtracted from the force error $\Delta f'$ conducting the dead-zone computation, at the subtracting section 20. At the characteristic-compensation computing section 21, the characteristic-compensation computation on the control is effected to the output $\Delta f' - K\Delta x$ of the subtracting section, to output the velocity command u. At the virtual compliance control, the velocity command is so computed as to move in imitation of the equation (1) mentioned above, by the virtual mass matrix M and the virtual viscosity-coefficient matrix C. In fact, the computation is conducted in the following form in which the equation (1), for example, is modified by a discrete system:

$$u_n = \Delta t M^{-1}(\Delta f' - K\Delta x) + (I - \Delta t M^{-1} C) u_{n-1} \qquad (2)$$

Here, $\Delta t$ is a sampling cycle, and $u_n$ expresses a sampling of n times. Further, u is a six-dimensional vector expressing the translating velocity and the rotational velocity, $\Delta f'$ is a six-dimensional vector expressing the error of the force/moment, Δx is a six-dimensional vector expressing the error of the position/posture, and M, C and K are a 6×6 matrix in which, particularly, the orthogonal matrix is used.

Here, the parameters K, M and C of each element and the width of the dead zone are given on the base coordinate system, so that the control computation of the position/force is conducted on the base coordinate system.

The velocity command u computed by the control computing section 17 of the position/force is a command for moving the robot 1. The velocity command u is transformed to an angular velocity w of each joint of the robot by the angular-velocity computing section 23, and further is transformed to the rotational velocity of the motor by the motor-velocity computing section 24. Subsequently, the robot 1 is controlled so as to move at this velocity, by the servo-amplifier 25.

The operation of the force-command correcting section 7A will next be described.

First, a way of thinking regarding the computation of the urging force will be described with reference to FIGS. 3 and 4.

Figure 3:
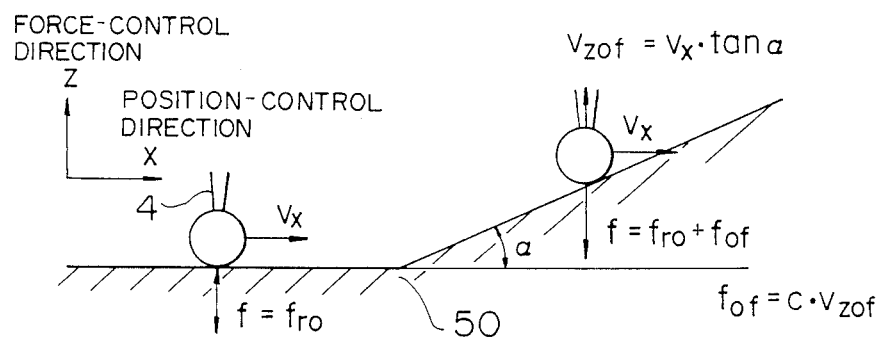
FIG. 3 is a view of forces generated in a profiling operation.

FIG. 3 is a view showing a way of giving the urging-force command, and illustrates an example of the case where a surface of a work 50 is profiled by the working tool 4. For convenience of explanation, the width of the dead zone in an x-axis direction is taken as being large by the control computing section 17 shown in FIG. 1 in the position control, and the spring constant in a z-axis direction is brought to 0 (zero) in the force control. Further, the command $f_{r0}$ of the constant urging force is set in the z-axis direction by the force-command setting section 7, and is outputted directly to the force-error computing section 12. In this case, in the force control loop, a z-axis component $u_z$ of the velocity command u is computed by the control computing section 17, from the error Δf between the force command $f_{r0}$ and the force/moment f on the basis of the detecting value. The working tool 4 is urged against the work surface with the force command value $f_{r0}$ by the velocity command $u_z$. On the other hand, in the position control loop, an x-axis component $u_x$ of the velocity command u is computed by the control computing section 17, from the error Δx between the position/posture command $x_r$ and the position/posture x on the basis of the detecting value. The working tool 4 is fed in the x-axis direction at the feed velocity $v_x$ on the basis of the velocity command $u_x$.

In this condition, if an inclination angle of the work surface with respect to the feed direction of the working tool 4 obtained by the velocity command $u_x$ is α, and if a gradient of the inclination angle is expressed by tan α, the working tool 4 is fed with the velocity $v_x$ based on the velocity command $u_x$, while being urged against the work surface with the force command $f_{r0}$. Accordingly, in the working tool 4, the following velocity occurs in the z-axis direction by the gradient tan α of the work surface in the feed direction:

$$v_{zof} = v_x \tan \alpha.$$

Thus, the following urging force is generated by the velocity $v_{zof}$, separately from the command $f_{of}$:

$$f_{of} = Cv_{zof}.$$

In this connection, C is a viscosity-attenuation coefficient which is set by the virtual compliance control. By this reason, in spite of the fact that the urgin-force command $f_{r0}$ is set by the force-command setting section 7, the urging force $f = f_{r0} + f_{of}$, in fact, occurs. Accordingly, in order to obtain the set urging force $f_{r0}$, it is desirable that a value subtracting the force $f_{of}$ from the urging-force command $f_{r0}$ is brought to the urging-force command. That is, if the urging-force command is $f_r$, its command $f_r$ is obtained by the following equation:

$$f_r = f_{r0} - Cv_x \tan \alpha.$$

The embodiment is based on the knowledge described above, and the computation is effected by the gradient computing section 61, the feed-velocity computing section 62 and the urging-force computing section 63 illustrated in FIG. 1, to control the working tool 4 so as to profile the work surface with the constant urging force.

Figure 4:
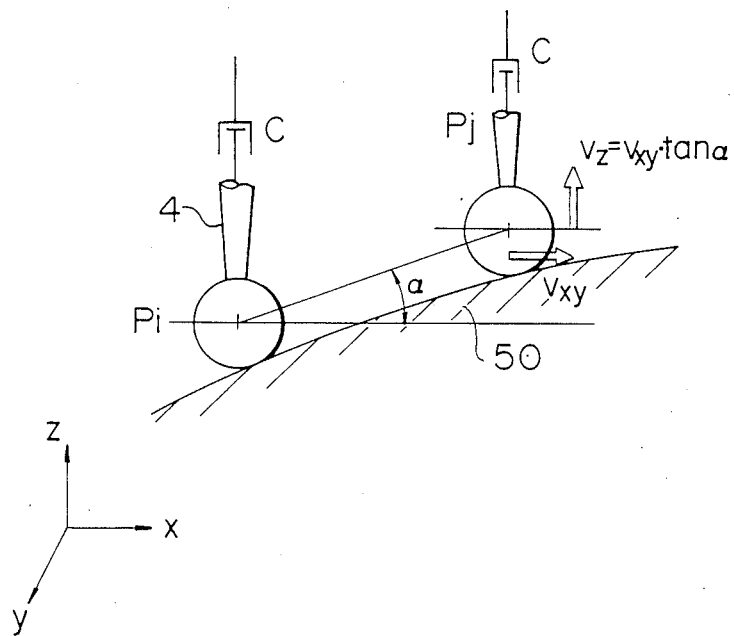
FIG. 4 is a view for explanation of a computation method of a gradient according to the embodiment.

That is, as shown in FIG. 4, if the present position stored in the memory section 60 while profiling the surface of the work 50 is a point $P_j(x_j, y_j, z_j)$, and if a position prior to the present position is a point $P_i(x_i, y_i, z_i)$, the gradient tan α of the work surface at the point $P_j$ can approach the following equation:

$$\tan \alpha = \frac{z_j - z_i}{\sqrt{(x_j - x_i)^2 + (y_j - y_i)^2}}$$

The above equation is computed by the gradient computing section 61.

Moreover, in FIG. 4, a component $v_x$ in the x-axis direction and a component $v_y$ in the y-axis direction of the feed velocity v of the working tool 4 at the point $P_j$ can be expressed as follows:

$$v_x = (x_j - x_i)/\Delta t$$

$$v_y = (y_j - y_i)/\Delta t.$$

Here, Δt is a detecting time between the point $P_i$ and the point $P_j$. As Δt, the hand positions must successively be stored by the memory section 60 in terms of the constant time duration Δt, and the time duration Δt must be stored in the feed-velocity computing section 62. Accordingly, the magnitude $v_{xy}$ of the feed velocity in a direction parallel to an x-y plane can approximate the following equation:

$$v_{xy} = \sqrt{v_x^2 + v_y^2}$$

The above computation is effected by the feed-velocity computing section 62. In this connection, in the above-described example shown in FIG. 3, only the x-axis directional component of the feed velocity is computed.

In the urging-force computing section 63, force $f_{of} = Cv_{xy} \tan \alpha$ occuring in the z-axis direction is computed by the velocity $v_{xy}$ from the gradient tan α computed by the gradient computing section 61, the feed velocity $v_{xy}$ computed by the feed-velocity computing section 62 and the viscosity attenuation coefficient C set beforehand. A new urging-force command $f_r$ is computed from the force $f_{of}$ and the force command $f_{r0}$ set by the command setting section 7, by the aforesaid equation $= f_{r0} - Cv_{xy} \tan \alpha$.

The new urging-force command $f_r$ obtained by the urging-force computing section 63 in this manner is sent to the force-error computing section 12 as the force command $f_r$, and is used in obtaining the aforementioned force error $\Delta f$.

In the emobnodiment constructed as above, in case where the work surface is profiled by the robot 1 to effect the curved-surface profiling operation in which surface polishing, deflashing and the like are performed, it is possible to move the working tool 4 while being urged against the work surface with the force of the command $f_{ro}$. Accordingly, it is possible to effect operation which is smooth and efficient for a work piece having an unknown configuration.

Further, in case where the curved-surface profiling operation is conducted, a way can be considered (refer to Japanese patent application No. 63-48486 corres. to U.S. Ser. No. 316,696 and EPC patent application No. 89200495.3) in which transformation for movement is conducted, as a way in which the working tool 4 is urged against the work surface by the constant urging force. In the embodiment of the invention however, in order to control only the urging force in agreement with the configuration of the work surface, no complicated computation such as transformation or the like is necessary as compared with the above way, so that a high-speed computation treatment can be made possible.

SECOND EMBODIMENT

A second embodiment of the invention will be described with reference to FIGS. 5 and 6. In the figures, members or elements similar to those illustrated in FIGS. 1 and 2 are designated by the same reference numerals.

Figure 5:
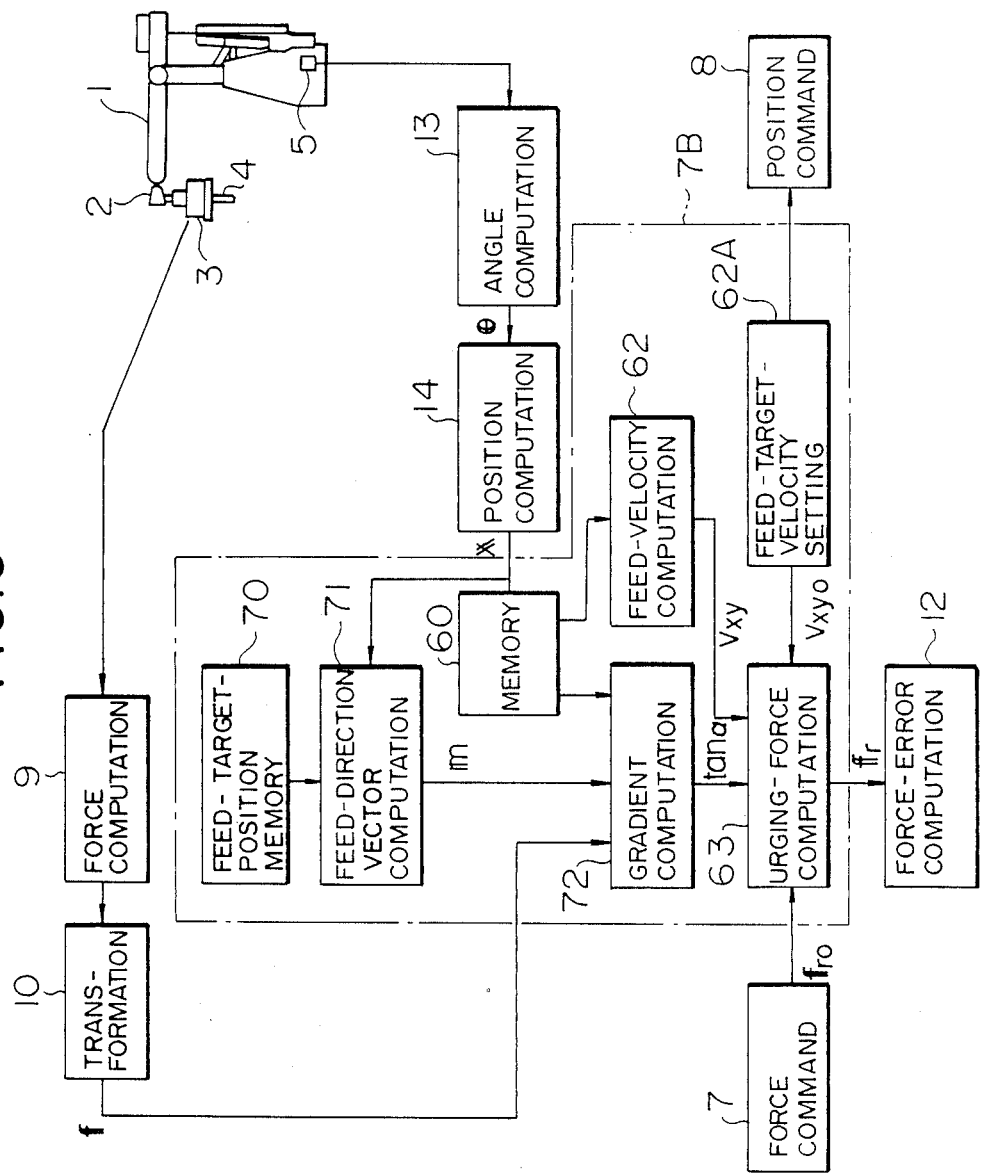
FIG. 5 is a functional block diagram showing a construction of a force-command correcting section of a profiling control system according to a second embodiment of the invention.

As shown in FIG. 5, a force-command correcting section 7B of a profiling control system according to the embodiment comprises the following elements, in addition to the arrangement of the first embodiment illustrated in FIG. 2. That is, the force-command correcting section 7B comprises a memory section 70 for storing therein a feed-target position at the start of the profiling operation of the working tool 4, a feed-directional vector computing section 71 for computing a feed-directional vector m from the position computed by the position computing section 14 and the feed-target position stored in the memory section 70, and a setting section 62A for setting a feed-target velocity $v_{xyo}$ at the start of the profiling operation of the working tool. In addition to the function of the gradient computing section 61 in the first embodiment, the gradient computing section 72 has a function of computing the gradient tan $\alpha$ of the work surface from the reaction-force vector f acting upon the working tool 4, which is obtained by the force computing section 9 and the transformation section 10 shown in FIG. 1, and from the feed-directional vector m obtained by the feed-directional-vector computing section 71. The urging-force computing section 63 computes a new urging-force command $f_r$ from the gradient tan $\alpha$ of the work surface, obtained by the gradient computing section 72, the feed velocity $v_{xy}$ obtained by the feed-velocity computing section 62 or the feed target velocity $v_{xyo}$ set by the setting section 62A, and the force command $f_{ro}$ set in the force-command setting section 7.

The feed target velocity $v_{xyo}$ set in the section 62A is also sent to the position command setting section 8, in which $\tau v_{xyo}$ is successively added to the present position command to compute a new position command at each sampling time $\tau$. This computation is substantially the same as that carried out in the moving-position-command computing section 97 of the later-mentioned embodiment shown in FIG. 17, and thus the details are omitted here.

Figure 6:
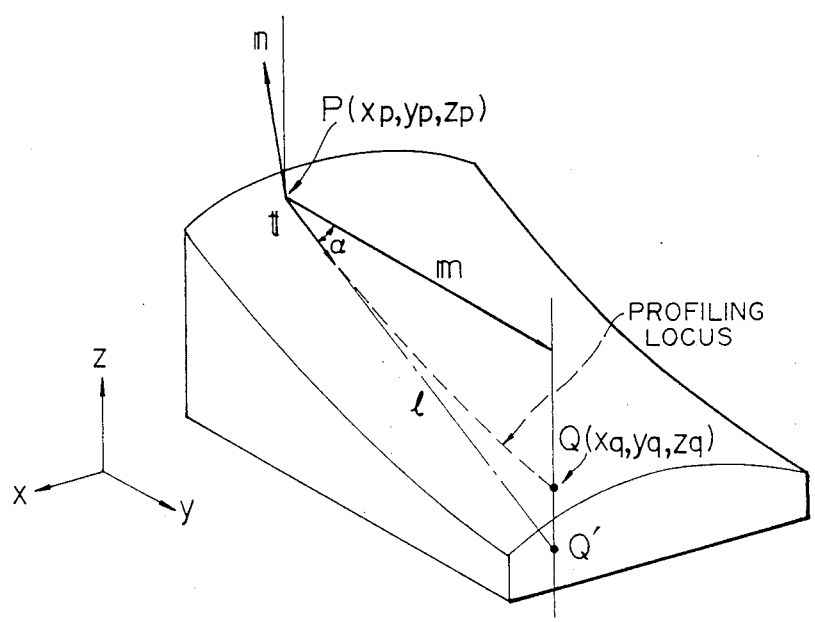
FIG. 6 is a view for explanation of a computation method of a gradient in the profiling control system illustrated in FIG. 5.

FIG. 6 is a view showing a way of giving the gradient tan $\alpha$ of the work surface in the force-command correcting section 7B of the embodiment, and illustrates a condition in which the working tool is urged against the surface of the work 50 to start the profiling operation.

In FIG. 6, the present position computed by the position computing section 14 is brought to a point $P(x_p, y_p, z_p)$, and the feed-command position of the working tool stored in the memory section 70 is brought to a point $Q(x_q, y_q, z_q)$. If a feed-directional vector m, which indicates the feed direction of the working tool 4, is obtained from the point P and the point Q, $m(x_q-x_p, y_q-y_p, 0)$ is obtained. This computation is carried out by the feed-directional-vector computing section 71.

Next, let it be supposed that the urging-reaction-force vector f of the work surface at the point P is consistent with a normal vector n. Then, a component of the normal vector n is expressed by three components $(f_x, f_y, f_z)$ of the reaction-force vector f in the x, y and z directions. Further, a unit vector in the moving direction along the work surface at the point P is t, and its directional cosine is expressed by $(t_x, t_y, t_z)$. Since the vector t is a contact vector with the work surface at the point P, the vector t is perpendicularly intersected with the normal-directional vector n. Since, accordingly, the inner product of the vectors intersected perpendicularly with each other is 0 (zero), the following equation holds:

$$n \cdot t = 0$$

Thus, $$f_x \cdot t_x + f_y \cdot t_y + f_z \cdot t_z = 0 \tag{3}$$

Now, if a point, at which a straight or linear line perpendicular to the x-y plane and passing through the point Q is intersected with a prolongation of the vector t is intersected, is Q', and a distance between the point P and the point Q' is $l$, a component of the vector PQ' is expressed by $(l \cdot t_x, l \cdot t_y, l \cdot t_z)$. Accordingly, the gradient tan $\alpha$ of the work surface in the point P is consistent with the gradient which is formed by the vector t with respect to the feed-directional vector m. Thus, the gradient tan $\alpha$ of the work surface can be obtained by the following equation:

$$\tan \alpha = l \cdot t_z / \sqrt{(l \cdot t_x)^2 + (l \cdot t_y)^2} \tag{4}$$

Here, if both the sides of the equation (3) are multiplied by $l$ to rearrange $l \cdot t_z$, the following equation can be obtained:

$$l \cdot t_z = -l(f_x t_x + f_y t_y)/f_z \tag{5}$$

Further, $l \cdot t_x$ and $l \cdot t_y$ are as follows, from the component of the normal-directional vector n:

$$l \cdot t_x = x_q - x_p \tag{6}$$
$$l \cdot t_y = y_q - y_p$$

Accordingly, if the equations (5) and (6) are used to rearrange the equation (4), the following equation can be obtained:

$$\tan \alpha = -\frac{f_x(x_q - x_p) + f_y(y_q - y_p)}{f_z \sqrt{(x_q - x_p)^2 + (y_q - y_p)^2}} \quad (7)$$

At the gradient computing section 72, the reaction-force vector f obtained by the feed-directional-vector computing section 71 and the feed-direction vector m obtained by the transformation section 10 are used to conduct the above computation thereby obtaining the gradient tan α of the work surface in the moving direction.

In the urging-force computing section 63, the gradient tan α of the work surface with respect to the feed direction obtained by the gradient computing section 72 in the manner described above, the command velocity $v_{xyo}$ set in the feed-target-velocity setting section 62A and the force command $f_{ro}$ set in the force-command setting section 7 are used to compute $f_r = f_{ro} - Cv_{xyo} \tan \alpha$, in a manner similar to the first embodiment, thereby computing the new urging-force command $f_r$ as an urging-force command. Accordingly, similarly to the first embodiment, a changing portion of the urging force occurring by the feed-target velocity $v_{xyo}$ is subtracted. Thus, it is possible to profile the work surface while the working tool 4 is urged with the command $f_{ro}$.

In a manner described above, from the stop condition of the working tool 4 to a condition just after the start of movement of the working tool 4 at start of the profiling operation, the feed-target position stored in the memory section 70 and the feed-target velocity $v_{xyo}$ set in the setting section 62A are used to compute a urging-force command, thereby effecting the control of the position/force. Once the working tool 4 begins to move, the position/force is controlled similarly to the first embodiment. That is, gradient computing section 72 computes the gradient tan α of the work surface with respect to the feed direction on the basis of the position data stored in the memory section 60. The feed-directional velocity computing section 62 computes the feed velocity $v_{xy}$ by the use of the position data stored in the memory section 60. The urging-force computing section 63 computes the urging-force command $f_r$ by the use of the gradient tan α of the work surface in the moving direction, obtained by the gradient computing section 72, the feed velocity $v_{xy}$ obtained by the feed-velocity computing section 62, and the force command $f_{ro}$ set in the force-command setting section 7.

As described above, in the embodiment, without the use of the detecting value of the position or the velocity, the position information on the profiling locus stored in the memory section 70 and the feed velocity $v_{xyo}$ set in the setting section 62A are used to compute the urging-force command. Accordingly, it is possible to compute the urging-force command even at the stop of the profiling operation, and it is possible to control the urging force even at the start of the profiling operation.

In connection with the above, as a manner of setting the feed-target velocity in the feed-target velocity setting section 62A, there are various ways which include a way in which an operator operates a joy stick, a keyboard and the like to command the feed-target velocity, a way in which two known points such as taught data and the like are stored beforehand, and so on.

THIRD EMBODIMENT

A third embodiment of the invention will be described with reference to FIGS. 7 and 8. In the figures, members or elements similar to those illustrated in FIGS. 1 and 2 are designated by the same reference numerals.

Figure 7:
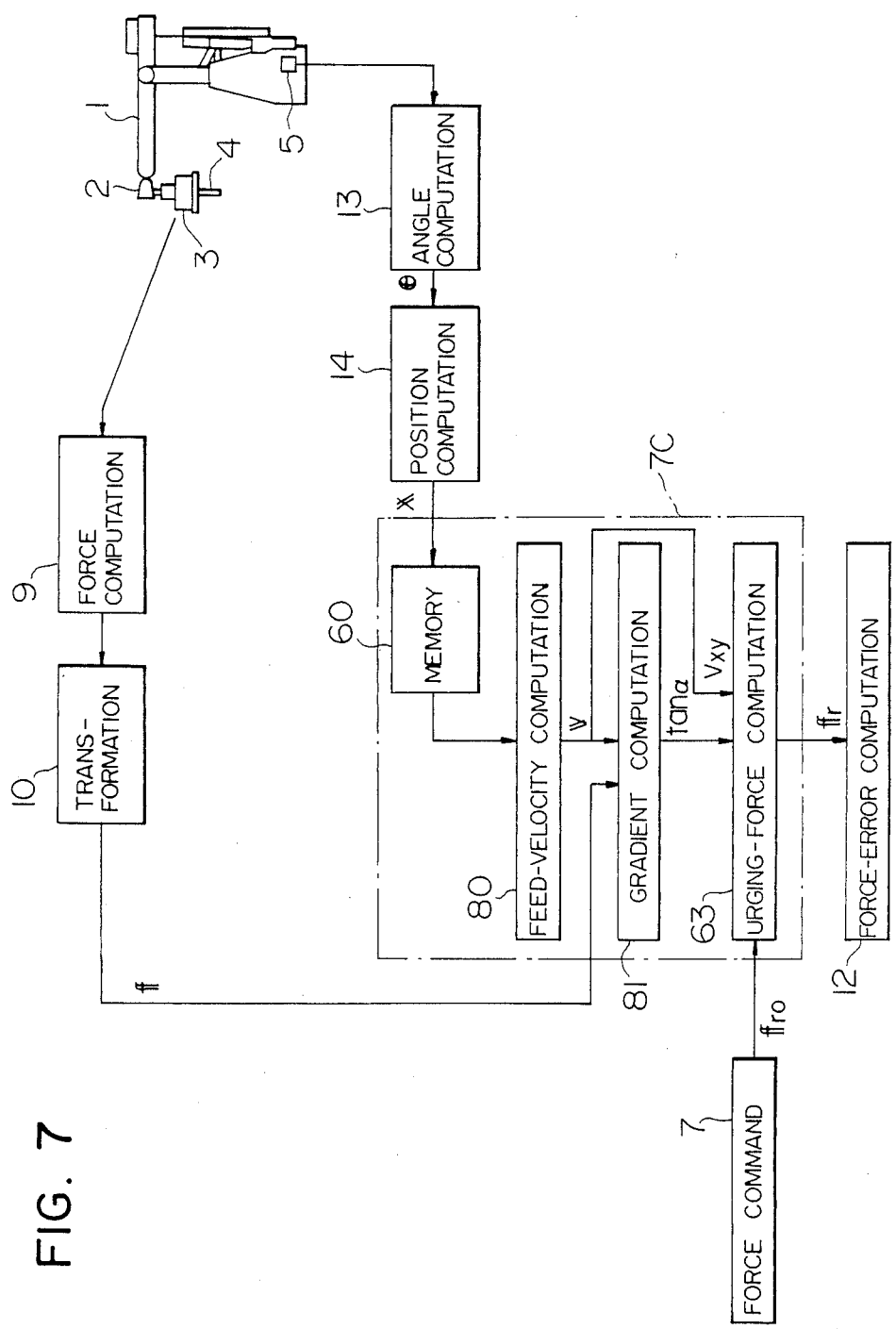
FIG. 7 is a functional block diagram showing a construction of a force-command correcting section of a profiling control system according to a third embodiment of the invention.

As shown in FIG. 7, a force-command correcting section 7C of a profiling control system according to the embodiment comprises a memory section 60 for successively storing therein the positions computed by the position computing section 14, a feed-velocity computing section 80 for computing a feed-velocity vector v of the working tool 4 in a direction perpendicular to the urging direction from the position stored in the memory section 60, a gradient computing section 81 for computing the gradient tan α of the work surface with respect to the feed direction from the direction of the reaction-force vector f acting upon the working tool 4 and computed by the force computing section 9 and the transformation section 10 and from a direction of the feed-velocity vector v obtained by the computing section 80, and an urging-force computing section 63 for computing a new urging-force command $f_r$ from the gradient tan α obtained by the computing section 81, the magnitude of the feed-velocity vector v obtained by the computing section 80 and the force command $f_{ro}$ set in the force-command setting section 7. The new urging-force command $f_r$, which is obtained by the urging-force computing section 63, is outputted to the force-error computing section 12.

The operation of this embodiment will next be described. Referring again to FIG. 4, a condition will be considered in which the surface of the work 50 is profiled by the working tool 4. At this time, the position of the working tool 4, which is computed by the position computing section 14 at intervals of each optional time Δt, is stored in the memory section 60. Further, in FIG. 4, $P_j$ is the present position of the working tool 4, and $P_i$ is a position prior to the present position. From these two positions, the components ($v_x$, $v_y$, $v_z$) of the feed-velocity vector v in a direction parallel to the x-y plane are as follows:

$$\begin{aligned} v_x &= (x_j - x_i)/\Delta t \\ v_y &= (y_j - y_i)/\Delta t \\ v_z &= 0 \end{aligned} \quad (8)$$

Moreover, their mean velocity is as follows:

$$|v| = \sqrt{v_x^2 + v_y^2} \quad (9)$$

The mean velocity is consistent with the magnitude of the feed-velocity command v, and is the same in value as the feed velocity $v_{xy}$ described in the first embodiment. Accordingly, the feed velocity will be expressed below by $v_{xy}$. The feed-velocity computing section 80 effects the computation mentioned above.

Figure 8:
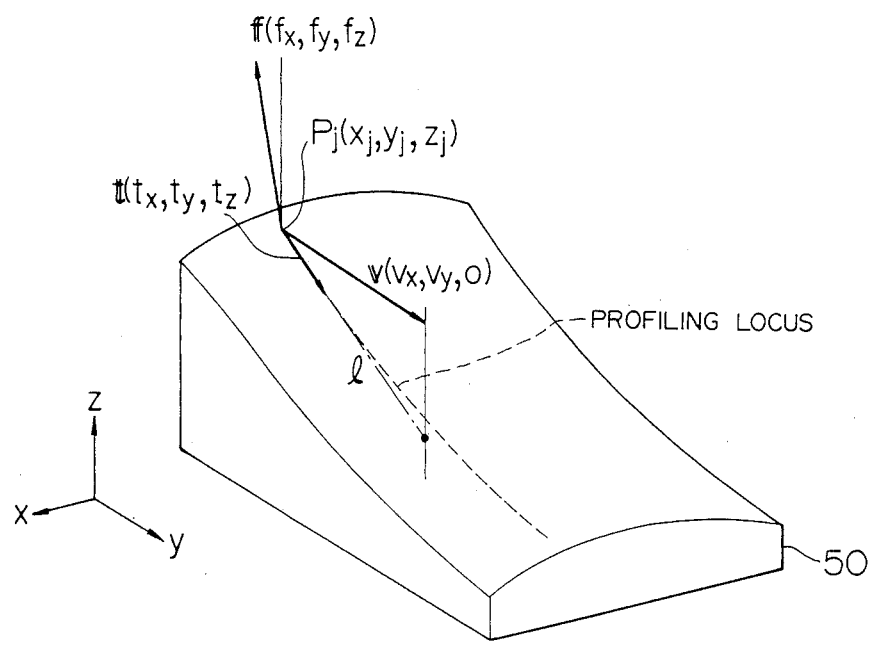
FIG. 8 is a view for explanation of a computation method in the profiling control system illustrated in FIG. 7.

FIG. 8 is a view showing a way of giving the gradient tan α of the work surface in the gradient computing section 81 of the embodiment. In FIG. 8, the present detecting position is the point $P_j$ in the same manner as FIG. 4, and the feed-velocity vector is expressed by v($v_x$, $v_y$, 0) described above. Now, let it be supposed that the urging-reaction-force vector f ($f_x$, $f_y$, $f_z$) of the work surface at the point $P_j$ is a normal-directional vector. Further, the unit vector in the moving direction on the work surface at the point $P_j$ is expressed by t, and its directional cosine is expressed by $(t_x, t_y, t_z)$. Since the vector t is the normal vector of the work surface at the point $P_j$, the vector t is intersected with the reaction-force vector f. Since, accordingly, the inner product of the vectors perpendicularly intersected with each other is 0 (zero), the following equation holds:

$$f \cdot t = 0$$

Thus, $$f_x \cdot t_x + f_y \cdot t_y + f_z \cdot t_z = 0 \quad (10)$$

Next, l is determined such that a value at the time the unit vector t is multiplied by l and the vector lt is projected onto the x−y plane is consistent with the feed-velocity vector v. At this time, the component of the vector lt is expressed by $(l \cdot t_x, l \cdot t_y, l \cdot t_z)$. Accordingly, the gradient $\tan \alpha$ at the point $P_j$ is consistent with a gradient which is formed by the vector t with respect to the feed-velocity vector v, so that the profiling gradient $\tan \alpha$ can be obtained by the following equation:

$$\tan \alpha = l \cdot t_z / \sqrt{(l \cdot t_x)^2 + (l \cdot t_y)^2} \quad (11)$$

Here, if both sides of the equation (10) are multiplied by l to rearrange $l \cdot t_z$, the following equation is obtained:

$$l \cdot t_z = -l(f_x t_x + f_y t_y)/f_z \quad (12)$$

Since, further, $l \cdot t_x$ and $l \cdot t_y$ are consistent with the feed-velocity vector v, the following relations are obtained:

$$l \cdot t_x = v_x \quad (13)$$
$$l \cdot t_y = v_y$$

Accordingly, the equations (12) and (13) are used to rearrange the equation (11), the following equation is obtained:

$$\tan \alpha = -\frac{f_x(x_j - x_i) + f_y(y_j - y_i)}{f_z \sqrt{(x_j - x_i)^2 + (y_j - y_i)^2}} \quad (14)$$

The gradient computing section 81 conducts the computation described above.

In the urging-force computing section 63, similarly to the first embodiment, $f_r = f_{ro} - Cv_{xy} \tan \alpha$ and is computed from the feed velocity $v_{xy}$, the gradient $\tan \alpha$ and the force command $f_{ro}$, to obtain a new urging-force command $f_r$. The working tool 4 is controlled such that the work surface is profiled with a constant urging force.

In the embodiment, the gradient $\tan \alpha$ is obtained by the procedure different from that of the first embodiment, so that it is possible to obtain advantages similar to those of the first embodiment.

FOURTH EMBODIMENT

A fourth embodiment of the invention will be described with reference to FIG. 9. In the figure, members or elements similar to those illustrated in FIGS. 1 and 2 are designated by the same reference numerals.

A force-command correcting section 7D of a profiling control system according to the embodiment comprises a memory 60 for successively storing therein the position data of the hand (tool) position/posture x, obtained by the position computing section 14, at intervals of each constant time in accordance with movement of the hand (tool), a moving-velocity computing section 82 for computing a moving velocity $V_{zof}$ of the working tool 4 in the urging direction on the basis of the position data stored in the memory section 60, and an urging-force computing section 83 for computing a new urging-force command $f_r$ from the moving velocity $v_{zof}$ obtained by the moving-velocity computing section 82 and the urging-force command $f_{ro}$ set by the force-command setting section 7. The new urging-force command $f_r$ obtained by the urging-force computing section 83 is outputted to the force-error computing section 12. Here, the position data stored in the memory section 60 are stored at the intervals of each constant time, and its numbers are within a range which is used by the moving-velocity computing section 82.

Other constructions of the profiling control system are the same as those of the first embodiment illustrated in FIG. 1.

The operation of the embodiment will be described with reference again to FIG. 4. In FIG. 4, when the work surface is profiled and the working tool 4 is urged in the z-axis direction, the present position stored in the memory section 60 is brought to a point $P_j(x_j, y_j, z_j)$, as mentioned previously, and a position prior to the present position is brought to a point $P_i(x_i, y_i, z_i)$. Then, the z-directional velocity $v_{zof}$ at the point $P_j$ can approach the following equation:

$$v_{zof} = \frac{z_j - z_i}{\Delta t}$$

Here, $\Delta t$ is a time between the points $P_i$ and $P_j$. The time $\Delta t$ is beforehand stored in the moving-velocity computing section 82. The moving-velocity computing section 82 effects the computation described above.

In the urging-force computing section 82, a force $f_{of} = Cv_{zof}$ occurring in the z-axis direction by the feed velocity is computed from the moving velocity $v_{zof}$ computed by the moving-velocity computing section 82 and the viscosity-attenuation coefficient C set beforehand. A new urging-force command $f_r$ is computed by the equation $f_r = f_{ro} - Cv_z$, from the force $f_{of}$ and the force command $f_{ro}$ set by the force-command setting section 7. That is, in substitution for the fact that, in the first through third embodiments, the force occurring in the z-axis direction is computed by the use of the gradient $\tan \alpha$ and the velocity $v_{xy}$, the force $f_{of}$ occurring in the z-axis direction is computed directly from the moving velocity $v_{zof}$ in the z-axis direction.

The new urging force obtained by the urging-force computing section 83 in the manner described above is sent to the force-error computing section 12 as the force command $f_r$, and is used for obtaining the force-error $\Delta f$.

Also in the embodiment, accordingly, it is possible to profile the work surface while the working tool 4 is urged with the force of the command $f_{ro}$, similarly to the first embodiment.

Further, in the embodiment, the computation is easy as compared with the procedure which computes the gradient in the first through third embodiments. Thus, a further high-speed computation treatment is made possible.

FIFTH EMBODIMENT

A fifth embodiment of the invention will be described with reference to FIGS. 10 and 11. In the figures, members or elements similar to those illustrated in FIGS. 1 and 2 are designated by the same reference numerals.

Figure 10:
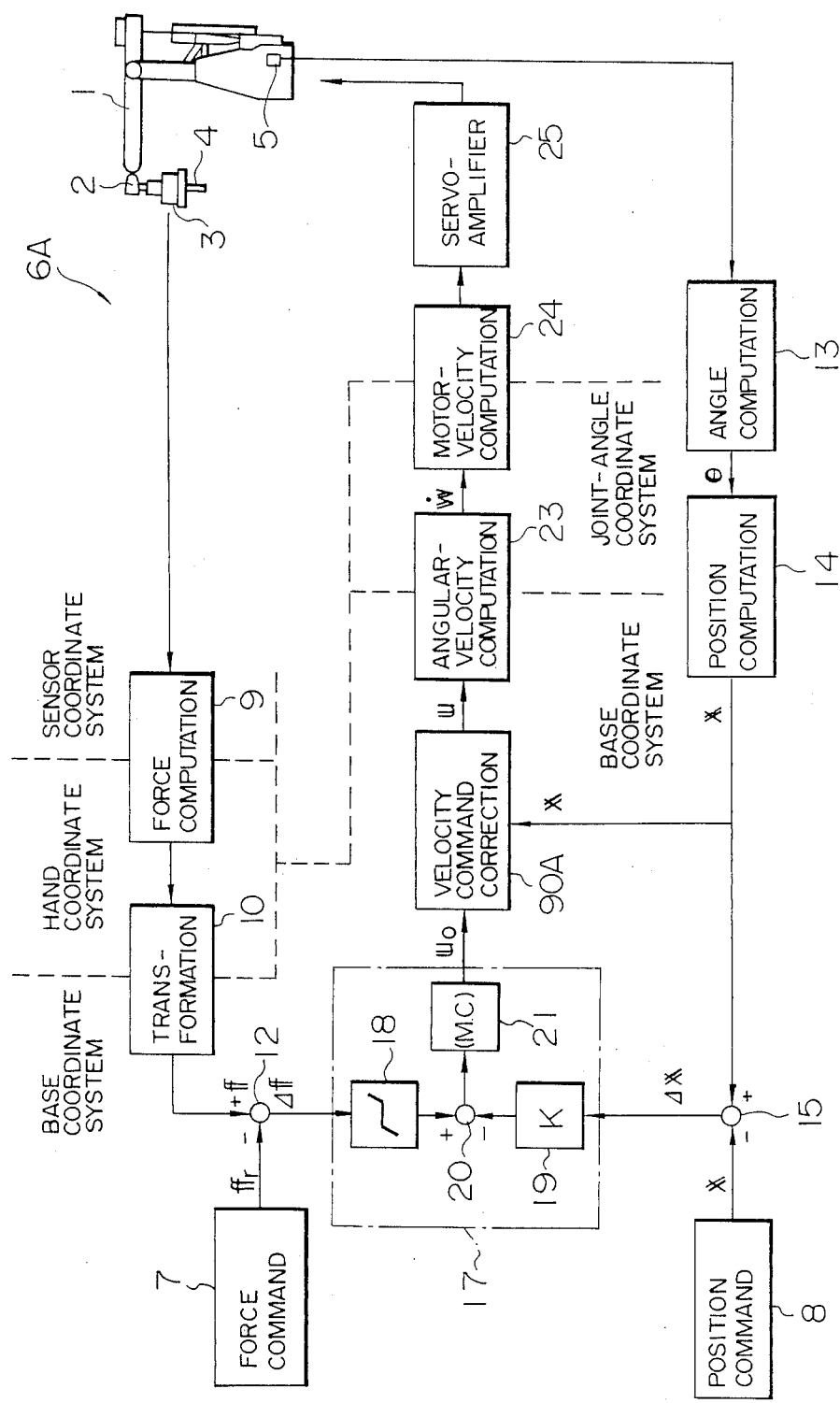
FIG. 10 is a functional block diagram showing an entire construction of a profiling control system according to a fifth embodiment of the invention.

In FIG. 10, a profiling control system 6A according to the embodiment is used in the following manner. That is, a velocity command $u_o$ is computed by the characteristic-compensation computing section 21 of the control computing section 17. The velocity command $u_o$ is corrected by a velocity-command correcting section 90A, to obtain a new velocity command u. The velocity command u is used in the angular-velocity computing section 23. The force command $f_r$ is sent from the force-command setting section 7 directly to the error computing section 12.

Figure 11:
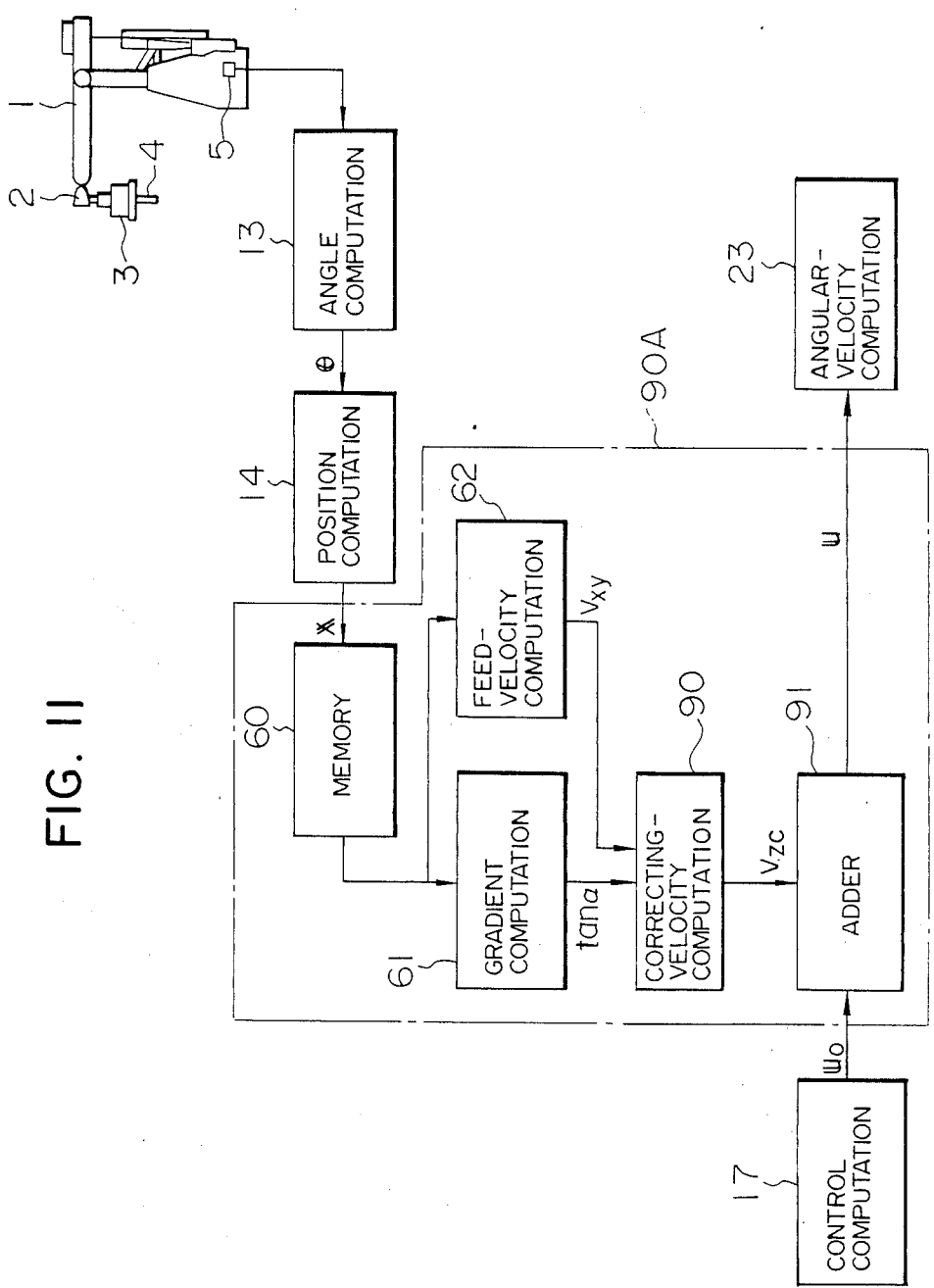
FIG. 11 is a functional block diagram showing a construction of a velocity-command correcting section of the profiling control system illustrated in FIG. 10.

As shown in FIG. 11, similarly to the force-command correcting section 7A of the first embodiment illustrated in FIG. 2, the velocity-command correcting section 90A comprises a memory section 60 for successively storing therein the position data of the hand position/posture x obtained by the position computing section 14, in accordance with movement of the hand, a gradient computing section 61 for computing the gradient tan $\alpha$ of the work surface with respect to the feed direction of the working tool 4 on the basis of the position data stored in the memory section 60, and a feed-velocity computing section 62 for computing a feed velocity $v_{xy}$ of the working tool 4, form the position obtained by the position computing section 14 and its detecting time $\Delta t$. Moreover, the velocity-command correcting section 90A comprises a correcting-velocity computing section 90 for computing a velocity correcting value $v_{zc}$ in the urging direction from the gradient tan $\alpha$ obtained by the gradient computing section 61 and the feed velocity $v_{xy}$ obtained by the feed-velocity computing section 62, and an adder 91 for adding the velocity correcting value $v_{zc}$ obtained by the computing section 90 to the z-axis component $u_{zo}$ of the velocity command $u_o$ obtained by the control computing section 17, to obtain a new velocity command u thereby outputting the velocity command u to the angular-velocity computing section 23.

As described previously with reference to FIGS. 3 and 4, when the working tool 4 moves with the velocity $v_{xy}$ in a direction parallel to the x-y plane while giving the urging-force command $f_r$ in the z-axis direction with the force command 7, the following velocity in the z-axis direction occurs in the working tool 4, due to the gradient tan $\alpha$ in the feed direction:

$$v_{zof} = v_{xy} \tan \alpha$$

By this velocity $v_{zof}$, the following force is generated:

$$f_{of} = C v_{zof}$$

In the embodiment, the velocity $v_{zof}$ is computed directly at the computing section illustrated in FIG. 11, and is added to the adding section 91 as a velocity correcting value in the urging direction. By doing so, an influence of the velocity changing portion $v_{zof}$ in the z-axis direction is eliminated to profile the work surface.

That is, in FIG. 4, two points including the present point $P_j$ stored in the memory section 60 and a position prior to the present position are used while profiling the work surface, to compute the gradient tan $\alpha$ of the work surface at the point $P_j$ in the gradient computing section 61. A procedure of computation is the same as that described with reference to the first embodiment.

On the other hand, in the feed-velocity computing section 62, the feed velocity $v_{xy}$ in a direction parallel to the x - y plane is computed from the position information of the two points $P_j$ and $P_i$, similarly to the first embodiment.

In the correcting-velocity computing section 90, the velocity $v_{zof}$ in the z-axis direction is obtained by computation of the following equation from the gradient tan $\alpha$ computed by the computing section 61 and the feed velocity $v_{xy}$ computed by the computing section 62:

$$v_{zof} = v_{xy} \tan \alpha$$

The velocity $v_{zof}$ is placed as the velocity correcting value $v_{zc}$, and is added by the adding section 91.

In this manner, in the embodiment, the force command $f_r$ is not corrected, but the velocity command $u_o$ computed by the control computing section 17 is corrected. By doing so, similarly to the first embodiment, it is possible to profile the work surface while urging the working tool 4 with the force of the command $f_r$.

Accordingly, also in the embodiment, it is possible to obtain advantages the same as those of the first embodiment.

SIXTH EMBODIMENT

Figure 12:
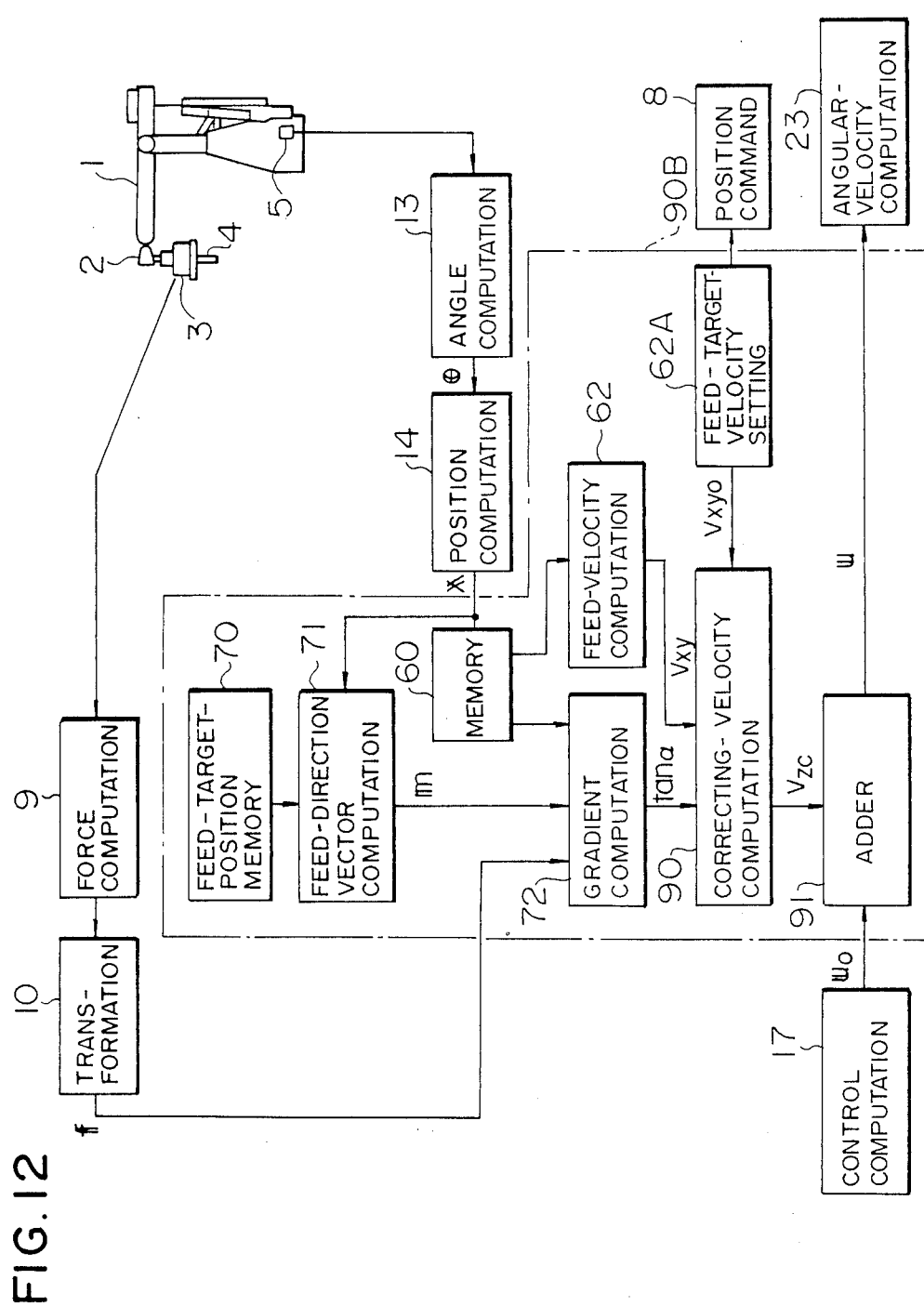
FIG. 12 is a functional block diagram showing a construction of a velocity-command correcting section of a profiling control system according to a sixth embodiment of the invention.

A sixth embodiment of the invention will be described with reference to FIG. 12. In the figure, members or components similar to those illustrated in FIGS. 5, 10 and 11 are designated by the same reference numerals.

In the embodiment, the computing means of the gradient tan $\alpha$ in the velocity-command correcting section of the fifth embodiment is replaced by the computing means of the gradient tan $\alpha$ in the second embodiment illustrated in FIG. 5. That is, as shown in FIG. 12, similarly to the force-command correcting section 7B of the embodiment shown in FIG. 5, a velocity-command correcting section 90B comprises a memory section 60, a feed-velocity computing section 62, a memory section 70 for storing therein the feed-target position, a feed-directional vector computing section 71 for computing a feed-directional vector m from the position computed by the position computing section 14 and the feed-target position stored in the memory section 70, a gradient computing section 72 for computing a gradient tan $\alpha$ of the work surface from the reaction-force vector f acting upon the working tool 4, computed by the force computing section 9 and the transformation section 10 and a feed-directional vector m obtained by the computing section 71, and a setting section 62A for setting a feed-target velocity $v_{xyo}$. Further, the velocity-command correcting section 90B comprises a correcting-velocity computing section 90 for computing a velocity command $v_{zc}$ in the urging direction from the gradient tan $\alpha$ obtained by the gradient computing section 61 and the feed velocity $v_{xy}$ obtained by the feed-velocity computing section 62 or the feed-target velocity $v_{xyo}$ set in the setting section 62A, and an adder 91 for adding the velocity correcting value $v_{zc}$ obtained by the computing section 90 to the z-axis component $u_{zo}$ of the velocity command $u_o$ obtained by the control computing section 17 to obtain a new velocity command u, thereby outputting the new velocity command u to the angular-velocity computing section 23.

The computing contents of the gradient computing section 72, which compute the gradient tan α of the work surface in the moving direction from the reaction-force vector f and the feed-direction vector m, are the same as those of the second embodiment shown in FIG. 5, and the computing contents of the correcting-velocity computing section 90 are the same as those of the fifth embodiment illustrated in FIG. 11.

Accordingly, also in the embodiment, it is possible to correct, by the velocity correcting value $v_{zc}$, the velocity command $u_o$ computed by the control computing section 17, similarly to the fifth embodiment, to profile the work surface while urging the working tool 4 with the force of the command $f_r$. Also, similarly to the second embodiment, it is possible to conduct the control from start of the profiling operation in which the working tool is stopped.

SEVENTH EMBODIMENT

Figure 13:
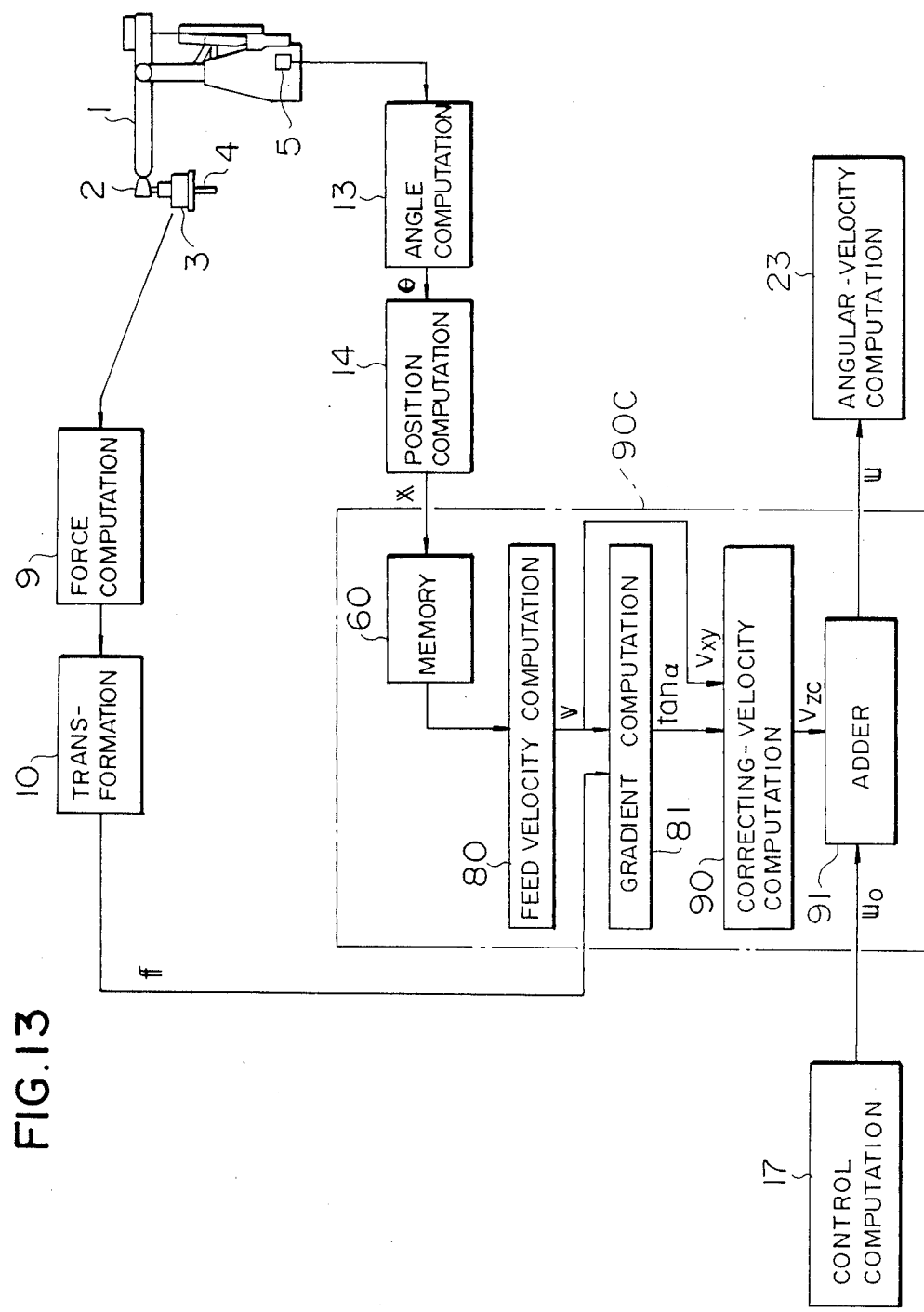
FIG. 13 is a functional block diagram showing a construction of a velocity-command correcting section of a profiling control system according to a seventh embodiment of the invention.

A seventh embodiment of the invention will be described with reference to FIG. 13. In the figure, members or components similar to those illustrated in FIGS. 7, 10 and 11 are designated by the same reference numerals.

In the embodiment, the computing means of the gradient tan α in the velocity-command correcting section of the fifth embodiment is replaced by the computing means of the gradient tan α in the third embodiment shown in FIG. 7. That is, as illustrated in FIG. 13, similarly to the force command correcting section 7C of the embodiment shown in FIG. 7, a velocity-command correcting section 90C of the embodiment comprises a memory section 60 for successively storing therein the positions computed by the position computing section 14, a feed-velocity computing section 80 for computing a feed-velocity vector v of the working tool 4 from the positions stored in the memory section 60, and a gradient computing section 81 for computing the gradient tan α of the work surface from the direction of the reaction-force vector f acting upon the working tool 4, computed by the force computing section 9 and the transformation section 10 and from the direction of the feed-velocity vector v. Further, the velocity-command correcting section 90C comprises a correcting-velocity computing section 90 for computing the velocity correcting value $v_{zc}$ in the urging direction from the gradient tan α obtained by the gradient computing section 81 and the magnitude of the feed-velocity vector v obtained by the feed-velocity computing section 80, and an adder 91 for adding the velocity correcting value $v_{zc}$ obtained by the computing section 90 to the z-axis component $u_{zo}$ of the velocity command $u_o$ obtained by the control computing section 17, to obtain a new velocity command u thereby outputting the new velocity command u to the angular-velocity computing section 23.

The computing contents conducted by the feed-velocity computing section 80 and the gradient computing section 81 are the same as those of the third embodiment shown in FIG. 7. The computing contents effected by the correcting-velocity computing section 90 are the same as those of the fifth embodiment illustrated in FIG. 11.

Accordingly, also in the embodiment, it is possible that, while the gradient tan α of the work surface in the moving direction is computed by the same way of thinking as that described with reference to the third embodiment, the velocity command $u_o$ computed by the control computing section 17 similarly to the fifth embodiment is corrected by the velocity correcting value $v_{zc}$, to control the working tool 4 so as to profile the work surface while the working tool 4 is urged with the force of the command $f_r$.

EIGHTH EMBODIMENT

Figure 14:
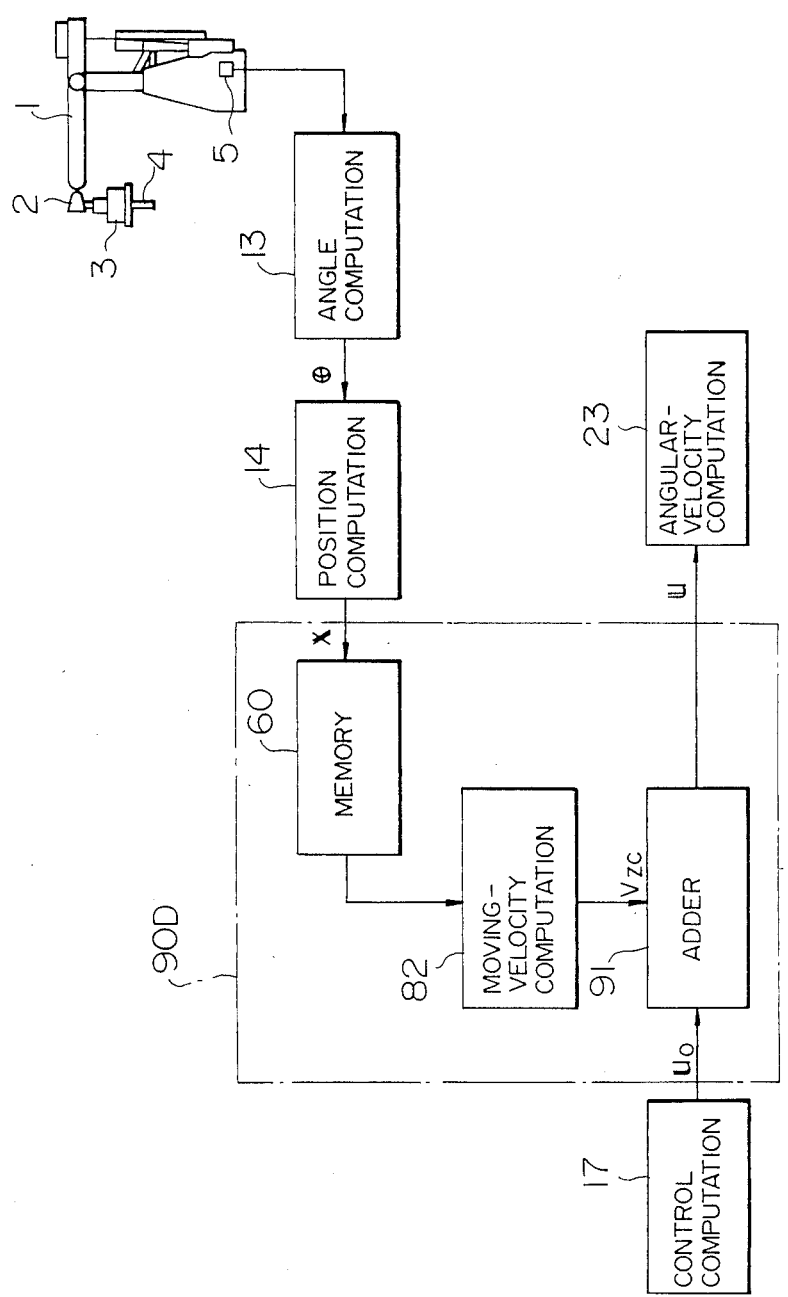
FIG. 14 is a functional block diagram showing a construction of a velocity-command correcting section of a profiling control system according to an eighth embodiment of the invention.

An eighth embodiment of the invention will be described with reference to FIG. 14. In the figure, members or components similar to those illustrated in FIGS. 9, 10 and 11 are designated by the same reference numerals.

Figure 9:
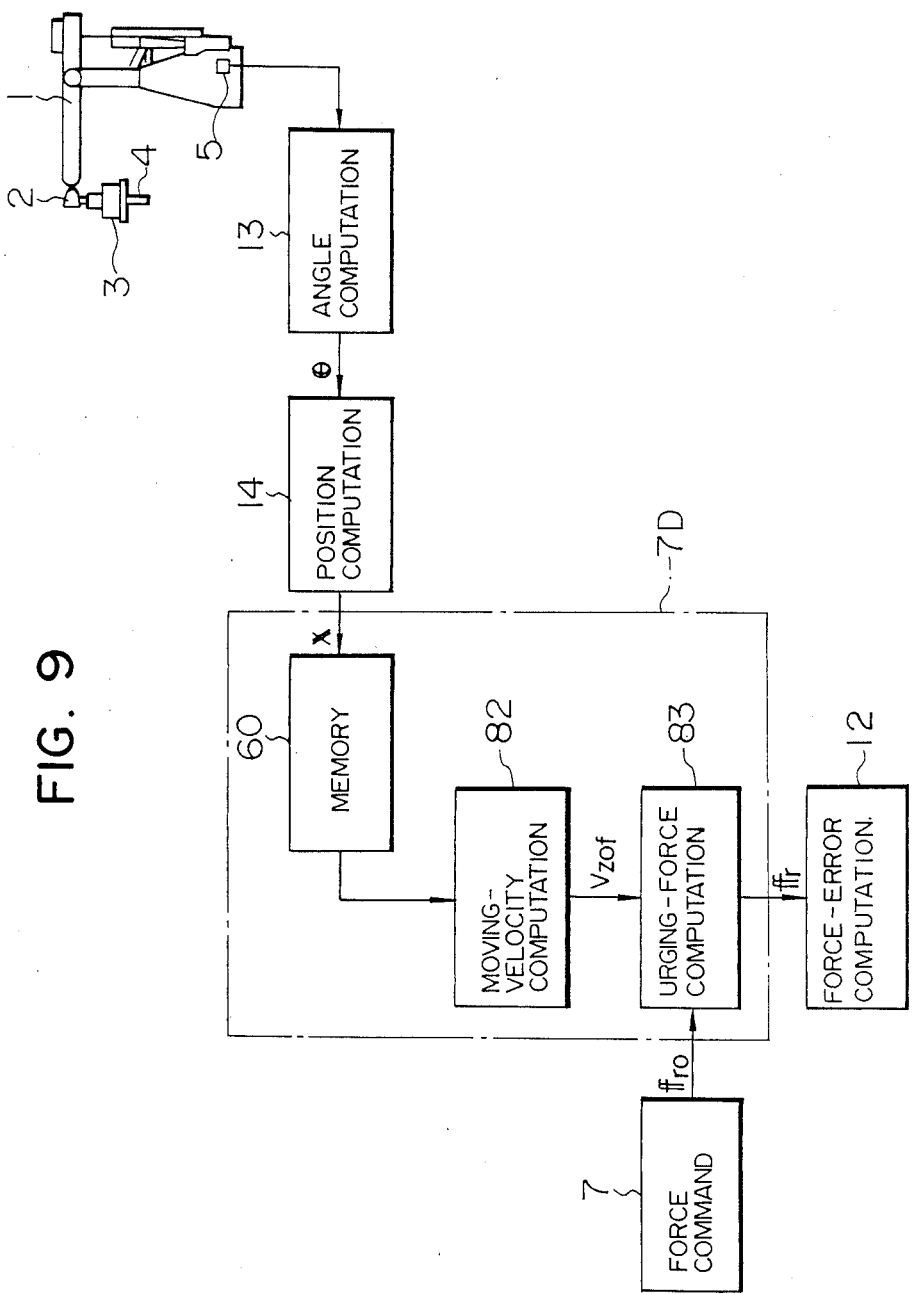
FIG. 9 is a functional block diagram showing a construction of a force-command correcting section of a profiling control system according to a fourth embodiment of the invention.

In the embodiment, the computing means of the velocity correcting value $v_{zc}$ in the velocity-command correcting section according to the fifth embodiment is replaced by the means for computing the moving velocity $v_{zof}$ of the working tool in the urging direction in the fourth embodiment shown in FIG. 9. That is, as shown in FIG. 14, a velocity-command correcting section 90D according to the embodiment comprises a memory 60 for successively storing the position data of the hand position/posture x obtained by the position computing section 14, at intervals of each constant time in accordance with movement of the hand, a moving-velocity computing section 82 for computing a moving velocity $v_{zof}$ of the working tool 4 in the urging direction on the basis of the position data stored in the memory section 60, to bring the moving velocity $v_{zof}$ to a velocity correcting value $v_{zc}$, and an adder 91 for adding the velocity correcting value $v_{zc}$ obtained by the computing section 82 to the z-axis component $u_{zo}$ of the velocity command $u_o$ obtained by the control computing section 17, to obtain a new velocity command u thereby outputting the velocity command u to the angular-velocity computing section 23.

The computing contents conducted by the moving-velocity computing section 82 are the same as those of the fourth embodiment illustrated in FIG. 9.

Accordingly, also in the embodiment, it is possible that, while relatively easy computation is effected similarly to that described with reference to the forth embodiment, the velocity command $u_o$ computed by the control computing section 17 is corrected by the velocity correcting value $v_{zc}$, similarly to the fifth embodiment, thereby controlling the working tool 4 so as to profile the work surface while the working tool 4 is urged with the command $f_r$.

NINTH EMBODIMENT

Figure 15:
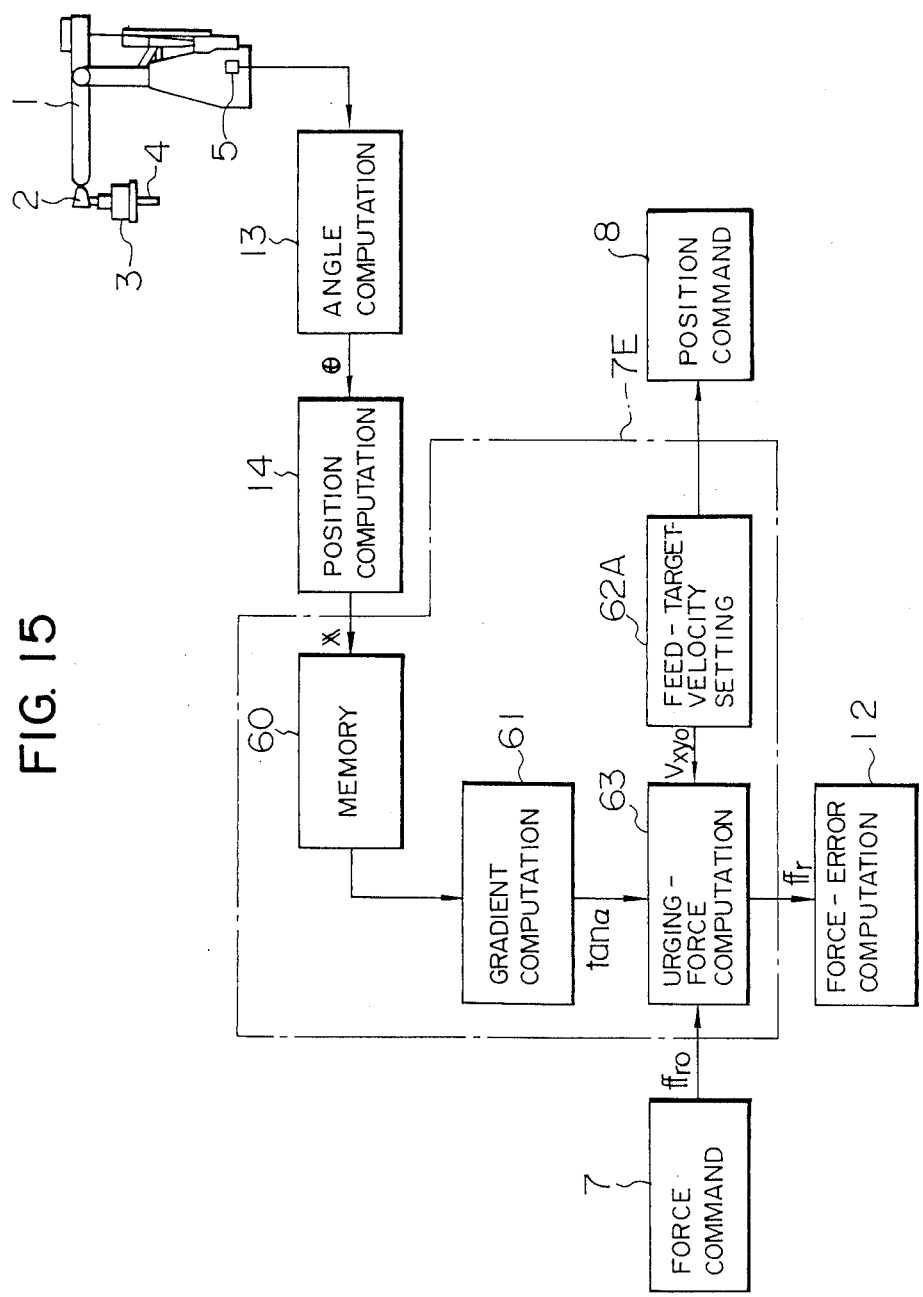
FIG. 15 is a functional block diagram showing a construction of a force-command correcting section of a profiling control system according to a ninth embodiment of the invention.

A ninth embodiment of the invention will be described with reference to FIG. 15. In the figure, members or components similar to those illustrated in FIGS. 1, 2 and 5 are designated by the same reference numerals.

In the first embodiment, the actual feeding velocity $v_{xy}$ of the working tool 4 is computed in the feed-velocity computing section 62, from the position obtained by the position computing section 14, and the feed velocity $v_{xy}$ is used to compute the urging-force command $f_r$ by the computing section 63. In the present embodiment, the feed-velocity computing section 62 is not used, but the feed-target-velocity setting section 62A is used. The function of the feed-target-velocity setting section 62A is the same as that of the feed-target-velocity setting section 62A of the second embodiment. In the urging-force computing section 63, a new urging-force command $f_r$ is computed from the gradient tan $\alpha$ obtained by the computing section 61, the feed-target velocity $v_{xyo}$ set by the setting section 62A and the urging-force command $f_{ro}$ set by the force-command setting section 7.

Also in the embodiment, it will be apparent that advantages similar to those of the first embodiment are obtained.

In connection with the above, although not shown, also in the fifth embodiment shown in FIG. 11, the feed-target-velocity setting section 62A can likewise be used in substitution for the moving-velocity computing section 62.

TENTH EMBODIMENT

A tenth embodiment of the invention will be described with reference to FIGS. 16 and 17. In the figures, members or components similar to those shown in FIGS. 1 and 2 are designated by the same reference numerals.

Figure 16:
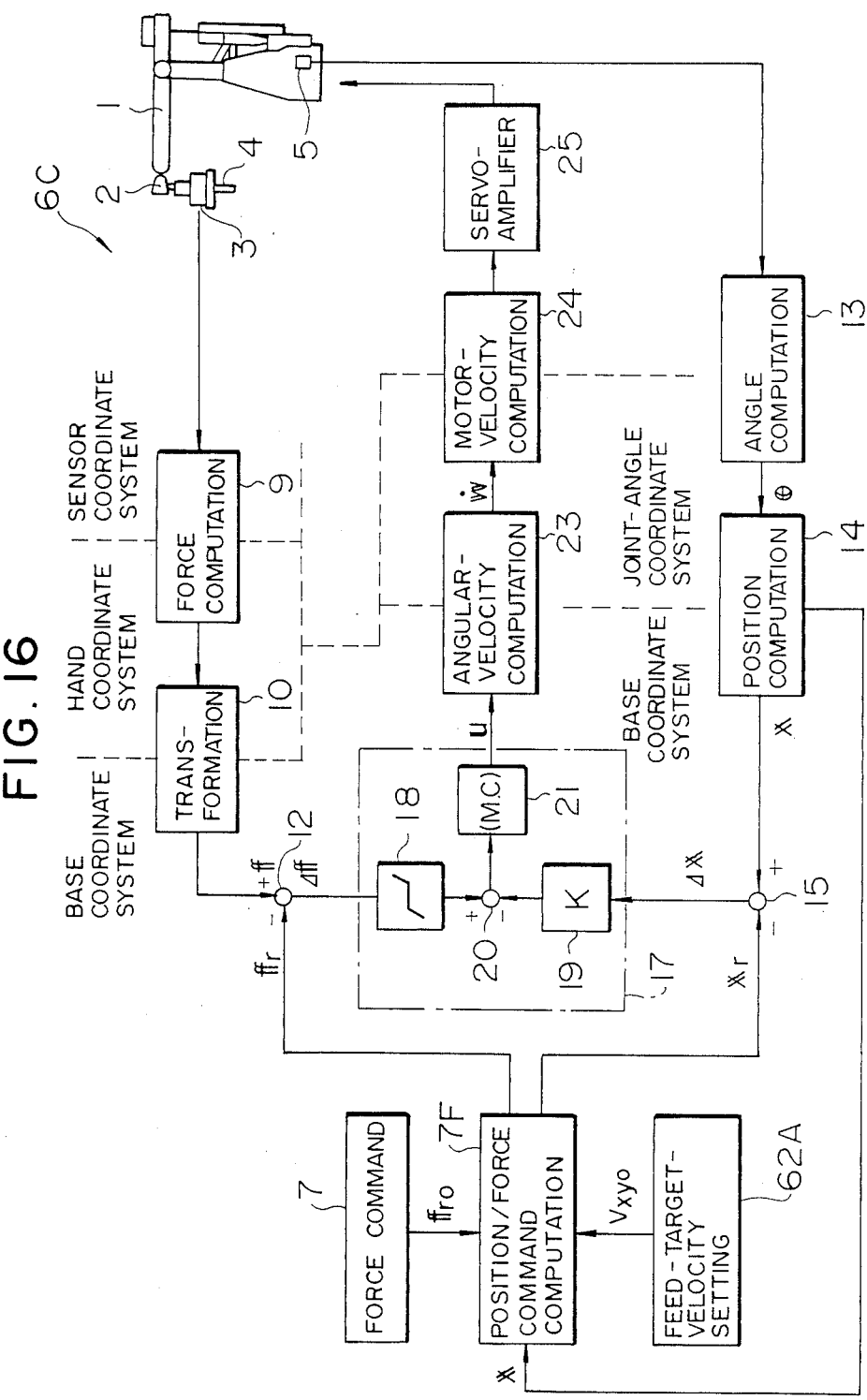
FIG. 16 is a functional block diagram showing an entire construction of a profiling control system according to a tenth embodiment of the invention.

In FIG. 16, a profiling control system 6C according to the embodiment comprises a position/force-command computing section 7F which stores therein the gradient of the work surface and the moving locus of the working tool beforehand as taught data. In the command computing section 7F, the force/moment command $f_r$ and the moving-position command $x_r$ are computed at playback from the taught data stored, the urging-force command $f_{ro}$ of the working tool 4 preset in the setting section 7, and the feed target velocity $v_{xyo}$ of the working tool 4 preset in the feed-velocity setting section 62A. The moving-position command $x_r$ and the force/moment command $f_r$ computed by the computing section 7F are sent respectively to the position-error computing section 15 and the force-error computing section 12, to obtain the force error $\Delta f$ and the position error $\Delta x$. Other constructions of the profiling control system 6C are the same as those of the first embodiment.

Figure 17:
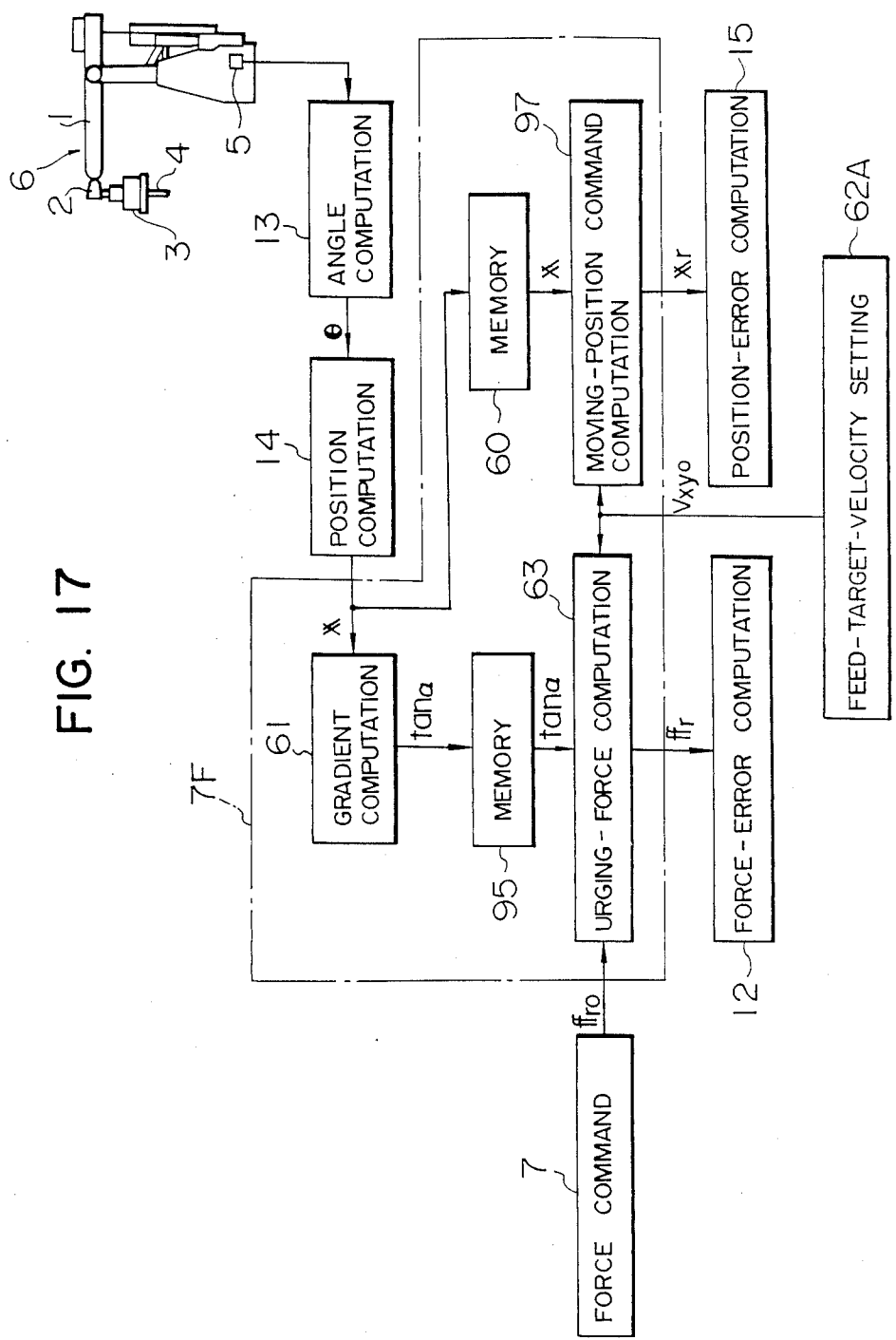
FIG. 17 is a functional block diagram showing a construction of a position/force-command computing section of the profiling control system illustrated in FIG. 16.

As shown in FIG. 17, the position/force-command computing section 7F comprises a memory section 60 for successively storing therein the position data of the hand position/posture x obtained by the position computing section 14, in accordance with movement of the hand, a gradient computing section 61 for computing a gradient tan $\alpha$ of the work surface with respect to the feed direction of the working tool on the basis of the position data of the position/posture x obtained by the position computing section 14, a gradient memory section 95 for successively storing the gradient tan $\alpha$ obtained by the gradient computing section 61 in accordance with movement of the working tool 4, an urging-force computing section 63 for computing a new urging-force command $f_r$ from the gradient tan $\alpha$ stored in the memory section 95, the feed target velocity $v_{xyo}$ set in the feed-target velocity setting section 62A and the urging-force command $f_{ro}$ set in the force-command setting section 7, and a moving-position-command computing section 97 for computing a moving-position command $x_r$ at intervals of one cycle from the position data x stored in the memory section 60 and the feed target velocity $v_{xyo}$ set in the feed target velocity setting section 62A such that the feed velocity of the working tool 4 is brought to the set feed target velocity.

In a teaching operation, the position data x of the working tool 4, obtained by the position computing section 14, are successively sent to the gradient computing section 61. In the gradient computing section 61, the gradient tan $\alpha$ of the work surface in a direction in which the working tool 4 between two adjacent points moves is computed from the position of the two points. Results of the computation are successively stored in the memory section 95. The computation contents of the gradient computing section 61 are the same as those of the gradient computing section 61 in the first embodiment.

Simultaneously, the positions x of the working tool 4 obtained by the position computing section 14 are successively stored in the memory section 60 in accordance with movement of the hand. The position data stored at this time are stored at intervals of optional time or at intervals of moving distance. Numbers of the position data are within a range which is used in the moving-position-command computing section 97.

Subsequently, the gradient and the position data stored in the memories 95 and 60 are used to conduct playback. That is, in the urging-force computing section 63, the gradient tan $\alpha$ stored in the memory section 95, the feed target velocity $v_{xyo}$ set in the feed target velocity setting section 62A and the urging-force command $f_{ro}$ set in the force-command setting section 7 are used to compute the command $f_r$ required for urging the work surface with the force of the command $f_{ro}$, from the equation $f_r = f_{ro} - Cv_{xyo} \tan \alpha$ in a manner similar to the aforesaid embodiments.

Moreover, in the moving-position-command computing section 97, the moving-position command $x_r$ is computed such that the working tool 4 moves through the position stored in the memory section 60 with the feed target velocity $v_{xyo}$ is set in the feed target velocity setting section 62A.

Computation for the above is conducted as follows. That is, a moving vector $l_{xy}$ on the $x-y$ plane is obtained from the position data $x_i$ of number i and the position data $x_{i+1}$ of number $i+1$ stored in the memory section 60. Further, components of the $l_{xy}$ in the x-axis and y-axis directions are brought respectively to $l_x$ and $l_y$. Here, in order to move between these two points with the given feed target velocity $v_{xyo}$, it is preferable that the moving amount per one sampling time is added to the present command at intervals of each sample. The moving amount $\Delta l$ is $\Delta l = v_{xyo} \cdot \tau$ ($\tau$: sampling time).

In fact, it is necessary to consider the above-described moving vector $l_{xy}$. A ratio between the length of the moving vector $l_{xy}$ and a component thereof in each axis direction is taken, and components in the x-axis direction and in the y-axis direction of the moving amount $\Delta l$ in the direction of the moving vector $l_{xy}$ are computed. That is, computation is made by the use of the following equations, to obtain the moving amount as the directional component in each axis:

$$\Delta l_x = v_{xyo} \cdot \tau \cdot \frac{l_x}{\sqrt{l_x^2 + l_y^2}}$$

$$\Delta l_y = v_{xyo} \cdot \tau \cdot \frac{l_y}{\sqrt{l_x^2 + l_y^2}}$$

These components are added to the position data to obtain the moving-position command $x_r$.

Accordingly, also in the embodiment, the urging-force command $f_r$ and the moving-position command $x_r$ are respectively computed and given at playback, whereby it is possible to profile the work surface while the working tool is urged with the force of the command f.

Further, according to the embodiment, the computed gradient tan α of the work surface is once stored as the taught data, and the urging-force command is computed by the use of the taught data. Accordingly, the computing amount during control decreases less than that of the aforementioned embodiment in which the urging-force command is computed while computing also the gradient tan α of the work surface in real time. Thus, the profiling control has superior response time.

In some of the above-mentioned embodiments, the feed velocity $v_{xy}$ is computed from the position data of the working tool, however, the value obtained by averaging the velocity command u may be used in place of the feed velocity $v_{xy}$.

Further, in the embodiments described previously, a case has been described where the working tool is gripped by the robot, and the work is fixed to the base, to effect the profiling operation. However, the invention is likewise applicable to a case where the work is gripped by the robot, and the the working tool is fixed to the base, to conduct the profiling operation.

What is claimed is:

1. A profiling control system which uses a multiple-degree-of-freedom working machine having at least two degrees of freedom, said profiling control system comprising: at least one force control loop including means for detecting force applied to a working tool from a work surface, means for taking an error between the detected force and a force command $f_{ro}$ of a preset urging force of the working tool, means for computing a velocity command $u_z$ of the working tool on the basis of said error, and means for moving the multiple-degree-of-freedom working machine on the basis of said velocity command $u_z$; means for commanding at least one velocity command $u_x$ of the working tool; and means for moving the multiple-degree-of-freedom working machine on the basis of said velocity command $u_x$, wherein said profiling control system comprises:

first control means for providing a moving velocity $v_{zof}$ in an urging direction of the working tool, which occurs due to a gradient tan α of the work surface with respect to a feed direction when the working tool is fed with said velocity command $u_x$ and while the working tool is urged against the work surface with said force command $f_{ro}$; and second control means for using said moving velocity $v_{zof}$ in the urging direction to correct a controlled variable including one of either said force command $f_{ro}$ or said velocity command $u_z$ of said force control loop, thereby canceling a force $f_{of}$ due to said moving velocity $v_{zof}$.

2. A profiling control system according to claim 1, wherein said first control means includes:

first computing means for computing said gradient tan α of the work surface;

second computing means for computing the feed velocity $v_x$ of the working tool fed with said velocity command $u_x$;

third computing means for computing said moving velocity $v_{zof}$ in the urging direction from the gradient tan α obtained by said first computing means and the feed velocity $v_x$ obtained by said second computing means.

3. A profiling control system according to claim 2, wherein said first computing means includes:

means for detecting a position of the working tool which moves on the work surface; and means for computing said gradient tan α of the work surface from two positions including a present point of the working tool on the work surface, which is detected by said detecting means.

4. A profiling control system according to claim 2, wherein said first computing means includes:

means for detecting a position of the working tool which moves on the work surface;

means for computing a direction of feed velocity vector v of said working tool from two positions including a present point of the working tool detected by said detecting means; and means for computing said gradient tan α of the work surface from a direction of said feed velocity vector v and a direction of the force detected by said force detecting means.

5. A profiling control system according to claim 1, wherein said first control means includes:

first computing means for computing said gradient tan α of the work surface;

means for setting a feed target velocity $v_{xyo}$ of the working tool; and second computing means for computing said moving velocity $v_{zof}$ in the urging direction from the gradient tan α obtained by said first computing means and said feed target velocity $v_{xyo}$.

6. A profiling control system according to claim 5, wherein said first computing means includes:

means for detecting a position of the working tool which moves on the work surface;

means for presetting a feed-target position of the working tool;

means for computing a feed-direction vector m in a direction perpendicular to the urging direction of the working tool from two positions which include a present position of the working tool on the work surface, detected by said detecting means, and said feed-target position; and means for computing said gradient tan α of the work surface from said feed-direction vector m and a direction of said force detected by said force detecting means.

7. A profiling control system according to claim 1, wherein said first control means includes:

means for detecting a position of the working tool which moves on the work surface; and computing means for computing said moving velocity $v_{zof}$ in saidg urging direction from two positions which include a present point of the working tool on the work surface, which is detected by said detecting means, and from a moving time between said two positions.

8. A profiling control system according to claim 1, wherein said first control means includes:

means for beforehand storing said gradient tan α of the work surface; and computing means for computing said moving velocity $v_{zof}$ in the urging direction from said gradient tan α stored beforehand and said feed target velocity $v_{xyo}$.

9. A profiling control system according to claim 1, wherein said second control means includes:

first computing means for computing said force $f_{of}$ occurring due to said moving velocity $v_{zof}$ in the urging direction; and second computing means for subtracting said force $f_{of}$ from said command $f_{ro}$ of the urging force of said force control loop, to compute a new command $f_r$ of the urging force.

10. A profiling control system according to claim 1, wherein said second control means includes:
computing means for urging said moving velocity $v_{zof}$ in the urging direction as a velocity correcting value $v_{zc}$ and adding said velocity correcting value $v_{zc}$ to the velocity command $u_{zo}$ of said force control loop to compute a new velocity command $u_z$.

* * * * *